(12) United States Patent
Wetzer et al.

(10) Patent No.: US 7,124,059 B2
(45) Date of Patent: Oct. 17, 2006

(54) MANAGING MAINTENANCE FOR AN ITEM OF EQUIPMENT

(75) Inventors: Michael Wetzer, Saratoga Springs, NY (US); David P. West, II, Newnan, GA (US); Patrick E. Weir, San Francisco, CA (US); Gary R. Garrow, Burbank, CA (US); Charles P. Newton, III, Mansfield, TX (US)

(73) Assignee: Accenture Global Services GmbH, Palo Alto, CA (US)

( * ) Notice: Subject to any disclaimer, the term of this patent is extended or adjusted under 35 U.S.C. 154(b) by 100 days.

(21) Appl. No.: 10/799,914

(22) Filed: Mar. 12, 2004

(65) Prior Publication Data

US 2004/0254764 A1 Dec. 16, 2004

Related U.S. Application Data

(63) Continuation-in-part of application No. 09/947,157, filed on Sep. 4, 2001, and a continuation-in-part of application No. 09/946,032, filed on Sep. 4, 2001, and a continuation-in-part of application No. 09/946,095, filed on Sep. 4, 2001, and a continuation-in-part of application No. 09/946,894, filed on Sep. 4, 2001, now Pat. No. 6,820,038, and a continuation-in-part of application No. 09/947,136, filed on Sep. 4, 2001, and a continuation-in-part of application No. 09/947,024, filed on Sep. 4, 2001, and a continuation-in-part of application No. 09/946,160, filed on Sep. 4, 2001, and a continuation-in-part of application No. 09/825,633, filed on Apr. 3, 2001, now Pat. No. 6,738,748, and a continuation-in-part of application No. 09/690,793, filed on Oct. 17, 2000.

(51) Int. Cl.
*G06F 11/30* (2006.01)
*G06F 15/00* (2006.01)
*G21C 17/00* (2006.01)

(52) U.S. Cl. ............... 702/184; 702/182; 702/185; 455/67.11; 455/423; 361/683; 361/725; 434/366; 700/83; 372/86

(58) Field of Classification Search ............ 702/182, 702/184, 185; 455/67.11, 423; 361/683, 361/725; 434/366; 700/83; 372/86
See application file for complete search history.

(56) References Cited

U.S. PATENT DOCUMENTS 4,744,026 A 5/1988 Vanderbei (Continued)

FOREIGN PATENT DOCUMENTS

EP 0 639 815 A2 8/1994

(Continued)

OTHER PUBLICATIONS

Kroenke, David M. Database Processing: Fundamentals, Design, and Implementation. 1999 Prentice-Hall; NJ. pp. 3-23.*

(Continued)

*Primary Examiner*—James A Reagan
(74) *Attorney, Agent, or Firm*—Brinks Hofer Gilson & Lione

(57) ABSTRACT

A method and system for maintaining an item of equipment supports the provision of predictive maintenance in a manner which eliminates or reduces downtime of the equipment. The method includes tracking performance data on the equipment or a particular component of the equipment. At least one required maintenance activity is predicted based upon the performance data with respect to a defined performance standard. Performance of the required maintenance activity is scheduled at a defined respective time based upon the prediction.

43 Claims, 10 Drawing Sheets

U.S. PATENT DOCUMENTS

| | | | |
|---|---|---|---|
| 4,908,775 A | 3/1990 | Palusamy et al. | |
| 5,216,612 A * | 6/1993 | Cornett et al. | 700/96 |
| 5,295,065 A | 3/1994 | Chapman et al. | |
| 5,311,562 A | 5/1994 | Palusamy et al. | |
| 5,331,579 A | 7/1994 | Maguire, Jr. et al. | |
| 5,343,388 A | 8/1994 | Wedelin | |
| 5,434,775 A | 7/1995 | Sims et al. | |
| 5,596,507 A | 1/1997 | Jones et al. | |
| 5,630,070 A | 5/1997 | Dietrich et al. | |
| 5,710,723 A | 1/1998 | Hoth et al. | |
| 5,737,728 A | 4/1998 | Sisley et al. | |
| 5,754,451 A | 5/1998 | Williams | |
| 5,778,381 A | 7/1998 | Sandifer | |
| 5,826,236 A | 10/1998 | Narimatsu et al. | |
| 5,877,961 A | 3/1999 | Moore | |
| 5,890,133 A | 3/1999 | Ernst | |
| 5,918,219 A | 6/1999 | Isherwood | |
| 5,920,846 A | 7/1999 | Storch et al. | |
| 5,931,878 A | 8/1999 | Chapin, Jr. | |
| 5,963,911 A | 10/1999 | Walker et al. | |
| 5,970,437 A | 10/1999 | Gorman et al. | |
| 5,987,474 A | 11/1999 | Sandifer | |
| 5,995,915 A | 11/1999 | Reed et al. | |
| 6,014,633 A | 1/2000 | DeBusk et al. | |
| 6,038,539 A | 3/2000 | Maruyama et al. | |
| 6,067,486 A | 5/2000 | Aragones et al. | |
| 6,078,912 A | 6/2000 | Buerger et al. | |
| 6,101,481 A | 8/2000 | Miller | |
| 6,110,214 A | 8/2000 | Klimasauskas | |
| 6,128,543 A | 10/2000 | Hitchner | |
| 6,175,934 B1 | 1/2001 | Hershey et al. | |
| 6,192,325 B1 | 2/2001 | Piety et al. | |
| 6,230,200 B1 | 5/2001 | Forecast et al. | |
| 6,230,480 B1 | 5/2001 | Rollins, III | |
| 6,308,162 B1 | 10/2001 | Ouimet et al. | |
| 6,321,207 B1 | 11/2001 | Ye | |
| 6,349,274 B1 | 2/2002 | Kay et al. | |
| 6,418,361 B1 | 7/2002 | Sinex | |
| 6,496,814 B1 | 12/2002 | Busche | |
| 6,571,158 B1 | 5/2003 | Sinex | |
| 6,580,982 B1 | 6/2003 | Sinex | |
| 6,598,940 B1 | 7/2003 | Sinex | |
| 6,606,546 B1 | 8/2003 | Sinex | |
| 6,671,593 B1 | 12/2003 | Sinex | |
| 6,678,716 B1 | 1/2004 | Pronsati, Jr. et al. | |
| 6,684,136 B1 | 1/2004 | Sinex | |
| 6,691,006 B1 | 2/2004 | Sinex | |
| 6,691,064 B1 | 2/2004 | Vroman | |
| 6,738,748 B1 | 5/2004 | Wetzer | |
| 6,801,820 B1 | 10/2004 | Lilly et al. | |
| 6,810,406 B1 | 10/2004 | Schlabach et al. | |
| 6,820,038 B1 | 11/2004 | Wetzer et al. | |
| 2002/0072988 A1 | 6/2002 | Aram | |
| 2002/0143564 A1 | 10/2002 | Webb et al. | |
| 2002/0156692 A1 | 10/2002 | Squeglia et al. | |
| 2003/0036939 A1 | 2/2003 | Flores et al. | |
| 2003/0216888 A1 | 11/2003 | Ridolfo | |
| 2004/0019577 A1 | 1/2004 | Abdel-Malek et al. | |

FOREIGN PATENT DOCUMENTS

| | | |
|---|---|---|
| JP | 62026510 A | 2/1987 |
| JP | 03264250 A | 11/1991 |
| JP | 04025350 A | 1/1992 |
| JP | 8-263546 | 10/1996 |
| JP | 9-050599 | 2/1997 |
| JP | 09212555 A | 8/1997 |
| JP | 10-27200 | 1/1998 |
| JP | 2000-123089 | 4/2000 |
| JP | 2001-34324 | 2/2001 |
| JP | 2001-209676 | 8/2001 |
| WO | WO 98/44439 | 10/1998 |

OTHER PUBLICATIONS

McQueen, G., "Aircraft Maintenance," Industrial Maintenance & Plant Operations, Aug. 1996.

MIL-HDBK-61, Military Handbook , "Configuration Management Guidance," Sep. 1997.

IBM Technical Disclosure Bulletin, Computer-Aided Process Planning, v.37, n.4B, pp. 605-608, [online ], [retrieved Sept. 11, 2005 via EAST] (3pages).

Knotts, Robert M.H. Civil Aircraft Maintenance and Support; Fault Diagnosis from a Business Perspective, Journal of Quality in Maintenance Engineering, vol. 5, Nov. 4, 1999, pp. 335-347. [DIAGLOG; File 15 ].

Swanson, Computerized maintenance management systems: a study of system design, Production and Inventory Management Journal, $2^{nd}$ Qtr 1997, v.38, n.2, p. 11-15 (5 pages).

Dilger, Asset management, maintenance redefined, Manufacturing Systems, Jul. 1997, v.15, n.7, p. 122-128, [on-line], [retrieved Sept. 8, 2005 via DIALOG file 624.01167091](4 pages).

Koch, Manage data to tame the maintenance tiger, Electrical World, Mar/Apr2001, v.215, n.2, p.37. [on-line ], retrieved Sept. 8, 2005 via DIALOG file 624:01167091 (4 pages).

Anonymous, maintenance mania, Manufacturing Systems, May1998, v.16, n.5, p. 80-84, [on-line], [retrieved Sept. 8, 2005 via DIALOG file 15:01650138](4 pages).

Fulcher, ERP and PDM equals productivity,manufacturing systems, Aug1998, v.16, n.8, p. 36-40, [on-line], [retrieved Sept. 8, 2005 via DIALOG file 15:016901481](5 pages).

Al-Sultan, Maintenance control via mathematical programming, Journal of Quality in Maintenance Engineering, 1995, v 1, n.3, p. 36-46, [online], [retrieved Sept. 8, 2005 via DIALOG file 15:02271208](9 pages).

Avery, Datastream introduces new online buy system for MRO, Purchasing, Nov. 18, 1999, v.127, n.122 (1 page).

Szwedo, Increasing productivity in an AS/RS maintenance department. Production and Inventory Management Journal, $1^{st}$ Qtr 1995, v.36, n.1, p. 76-81 (6 pages).

Ho, An on-line system for aircraft maintenance, Journal of Systems Management, Sept. 1994, v.45, n.9, p. 24-27 (4 pages).

Anonymous, Bell & Howell offers maintenance kits, today, Feb. 2000, v.22, n.1, p. 10 (1 page).

International Search Report dated Oct. 4, 2002, for corresponding international appl. PCT/US02/09303.

Written Opinion dated Mar. 5, 2003, for corresponding international appl. PCT/US02/09303.

International Search Report dated Dec. 28, 2001, for corresponding international appl. PCT/US01/32154.

International Search Report dated Jan. 2, 2002, for corresponding international appl. PCT/US01/32576.

* cited by examiner

MANAGING MAINTENANCE FOR AN ITEM OF EQUIPMENT

CROSS REFERENCE TO RELATED APPLICATIONS

This application is a continuation-in-part of each of the following U.S. application Nos., all of which are incorporated herein by reference: U.S. Ser. Nos. 09/947,157, 09/946,032, 09/946,095, 09/946,894 now U.S. Pat. No. 6,820,038, 09/947,136, 09/947,024 and 09/946,160, all filed Sep. 4, 2001. This application is also a continuation-in-part of U.S. application Ser. No. 09/825,633, filed Apr. 3, 2001 now U.S. Pat. No. 6,738,748 and a continuation-in-part of U.S. application Ser. No. 09/690,793, filed Oct. 17, 2000 both are incorporated herein by reference.

FIELD OF THE INVENTION

This invention relates to a method and system for managing the maintenance an item of equipment in accordance with a maintenance plan.

BACKGROUND

In the prior art, maintenance of an item of the equipment may occur only after discovery of a defect or deficiency found during an inspection of the equipment. The inspection of the equipment may be performed incidentally to other maintenance activities or the inspection may be part of a scheduled program of maintenance. The scheduled program of maintenance may be organized based upon data or recommendations provided by a manufacturer of the equipment.

Prospective maintenance activities may include maintenance, repair, and overhaul activities. Prospective maintenance activities are planned and identified based on one or more prior inspections of equipment. If the inspections are delayed or too infrequent to uncover an actual or future deficiency, a user of the equipment may experience reduced availability of the equipment. For example, an actual or future deficiency may prevent use of the equipment or may result in a failure of the equipment during routine operation. Further, if the maintenance schedule provided by the manufacturer does not accurately reflect the true performance or reliability of the equipment, a user of the equipment may experience unwanted downtime. If the equipment, when properly functioning, is capable of generating revenue, the downtime of the equipment may negatively impact financial results of a business associated with the equipment. Similarly, if the equipment is essential for manufacturing or other uses, the downtime of the equipment may negatively impact financial results of a business associated with the equipment. Accordingly, a need exists for a method or system for maintaining an item of equipment according to a maintenance plan where unwanted downtime of equipment is reduced or eliminated.

A configuration defines the identity of the components (e.g., parts), a specification of the components, and the relationship among the arrangement of components of an item of equipment, among other things. Because some components are interchangeable with substitutes, the configuration of the item of equipment may vary throughout a life span of the equipment as maintenance activities (e.g., maintenance, repair, and overhaul) are performed. The configuration of the item of equipment may change because of a revision of product definitions or a review (e.g., a financial and performance review) of the item of equipment. Further, even during the manufacturing process, the manufacturer of the equipment may substitute different components (e.g., parts) from different suppliers to customize the equipment, to meet a certain technical specifications for the equipment, or to save manufacturing costs on the equipment. For example, the manufacturer may change technical specifications of equipment to rectify manufacturing anomalies or to facilitate more reliable production. Thus, standard as-built documentation on the equipment may contain erroneous information on the configuration of the equipment.

Maintenance, overhaul and repair personnel may keep few records of the actual configuration of the equipment because of over-reliance on the manufacturer's specifications, manuals, and as-built documentation. Even if configuration records are available, the records may be difficult to use or access. Thus, a need exists for promoting the maintenance of accurate records on equipment-related work with ready access to maintenance, overhaul and repair personnel.

SUMMARY OF THE INVENTION

In accordance with the invention, a method and system for managing the maintenance of an item of equipment supports the provision of maintenance in a manner which eliminates or reduces downtime of the equipment. Configuration maintenance requirements are determined for maintaining a target configuration of an item of equipment. Predictive maintenance requirements are determined for the item of equipment based on at least one of a longevity estimate, a probability of failure, and a financial analysis. A data processing system plans for the availability of at least one of resources and a component for performing maintenance consistent with the configuration maintenance requirements and the predictive maintenance requirements.

DETAILED DESCRIPTION

As used herein, a maintenance provider shall include any person or business entity that performs or supports maintenance, repair, or overhaul activity (i.e., an MRO activity) for at least one item of equipment. Similarly, as used herein, maintenance, a maintenance activity or a maintenance task shall include at least one of maintenance, repair, and overhaul (i.e., MRO) of an item of equipment or a component of the equipment, unless otherwise noted.

A component means a component of an item of equipment, a sub-component of an item of equipment, an assembly of an item of equipment, a system of an item of equipment, or any other constituent part of an item of equipment. A component may be defined based on its relationship with other components in an item of equipment and based upon the context of its use in the equipment. A component may include, but need not include, one or more sub-components. An assembly may comprise a group of integrated or inter-related components. A material refers to a raw material, a consumable material, a component, a provision, or another equipment-related resource concerning the performance of a maintenance activity.

Figure 1:
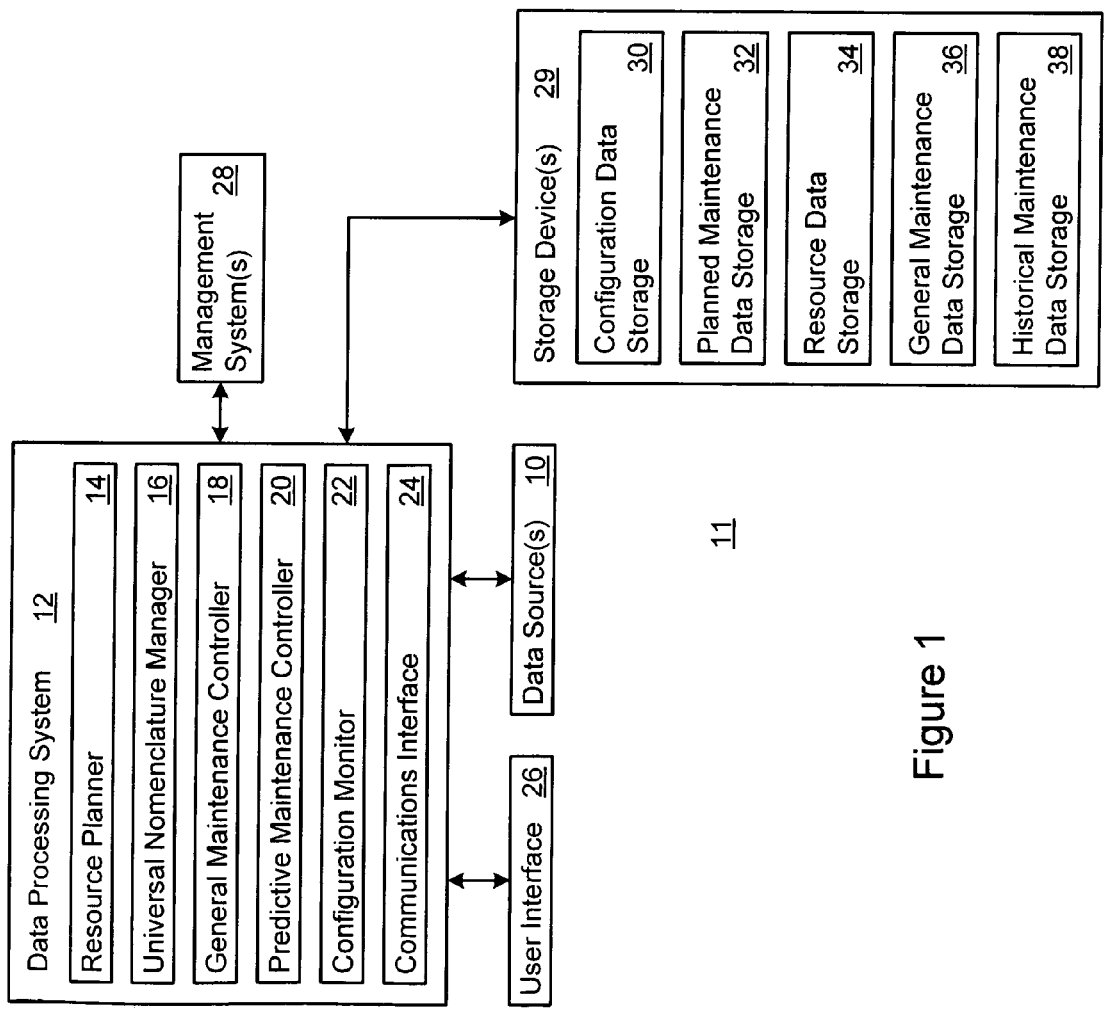
FIG. 1 is a block diagram of a system for managing maintenance in accordance with the invention.

In accordance with the invention, FIG. 1 shows a maintenance system 11 for managing maintenance of at least one item of equipment. The maintenance system 11 comprises one or more data sources 10 (e.g., external data sources) that communicate with a data processing system 12. The data processing system 12 cooperates with a storage device 29. The data processing system 12 communicates with one or more management systems 28. A user interface 26 is coupled to the data processing system 12 to allow a user to control and/or monitor the operation of the data processing system 12.

One or more data sources 10 provide input information to a data processing system 12. In one embodiment, the data processing system 12 processes the input information to determine output information for supporting maintenance and commercial activities incidental thereto. The data processing system 12 communicates the output information to one or more management systems 28. Each management system 28 facilitates implementation of maintenance consistent with the output information or other commercial activities in furtherance of maintenance.

In general, the data sources 10 may include one or more of the following: a supplier data source, an operational data sources, a human resources system, a project/personnel management system, a purchasing system/inventory control system, a financial system, a maintenance management system, a maintenance execution system, a maintenance input/output device, an engineering input/output device, a supervisory input/output device, and any additional input/output device that permits the input of data into the data processing system 12.

The data processing system 12 comprises one or more of the following data processing components: a resource planner 14, a universal nomenclature manager 16, a general maintenance controller 18, a predictive maintenance controller 20, a configuration monitor 22, and a communications interface 24. A data processing component may include hardware, software instructions, or both. The resource planner 14 refers to a data processing component for planning the availability of the at least one of the following items for a time interval at a geographic location to facilitate maintenance, repair or overhaul activity: (1) one or more workers, (2) a facility, (3) infrastructure, (4) test equipment, (5) a tool, (6) one or more components, and (7) a resource. The universal nomenclature manager 16 refers to a data management system that manages the translation and/or standardization of data that is used by the data processing system 12 to support maintenance of an item of equipment. The general maintenance controller 18 manages a general maintenance requirement that is not fully addressed by a predictive maintenance requirement and a configuration maintenance requirement. The predictive maintenance controller 20 determines a predictive maintenance requirement, if any, for maintaining an item of equipment. The configuration monitor 22 determines a configuration maintenance requirement, if any, for maintaining an item of equipment. A communications interface 24 supports communications between the data processing system 12 and one or more of the following: a data source 10, a group of data sources 10, a storage device 29, a group of storage devices 29, a management system 28, and a group of management systems 28.

One or more storage devices 29 support storage and retrieval of data for the operation of the data processing system 12. The data processing system 12 may input or output the following types of data: configuration definition data, planned maintenance data, maintenance resources data, general maintenance data, and historical maintenance data. In one embodiment, the storage device 29 may allocate storage dynamically or on a dedicated basis by the type of data to be stored. For example, the storage device 29 may allocate the data among one or more of the following storage allocations: a configuration data storage allocation 30, a planned maintenance data storage allocation 32, a resource data allocation 34, a general maintenance data storage allocation 36, and a historical maintenance data storage allocation 38.

In an alternate embodiment, the configuration data storage allocation 30 comprises a configuration database; the planned maintenance data storage allocation 32 comprises a planned maintenance database; the resource data storage allocation 34 comprises a maintenance resource database; the general maintenance data storage allocation 36 comprises a general maintenance database; and the historical maintenance data storage allocation 38 comprises a historical maintenance database.

The data processing system 12 facilitates integration of maintenance activities including one or more of the following: configuration maintenance, predictive maintenance, general maintenance, unplanned maintenance resource planning, and data management. Configuration maintenance refers to keeping a configuration up to date with engineering changes, technical enhancements, or modifications that are rolled out because of safety, regulatory, performance, or other concerns. Predictive maintenance refers to predicting the potential failure or potential break-down or of a component of an item of equipment and performing maintenance on the item of equipment based on the prediction to reduce or eliminate the down-time and maximize the availability of equipment for use (e.g., commercial use). General maintenance refers to maintenance that is neither predictive maintenance nor configuration maintenance. General maintenance includes at least unplanned maintenance. Unplanned maintenance refers to performing unscheduled maintenance that may be incident to planned maintenance activities or inspections. Unplanned maintenance also refers to performing maintenance to recover from a break-down or an unexpected equipment failure or problem. Resource planning refers to allocating resources (e.g., human resources and components) for a defined time frame and defined geographic location to handle current or prospective maintenance activities. Data management refers to data storage and retrieval, data processing, and communications for support of maintenance activities and other related commercial activities.

Figure 2:
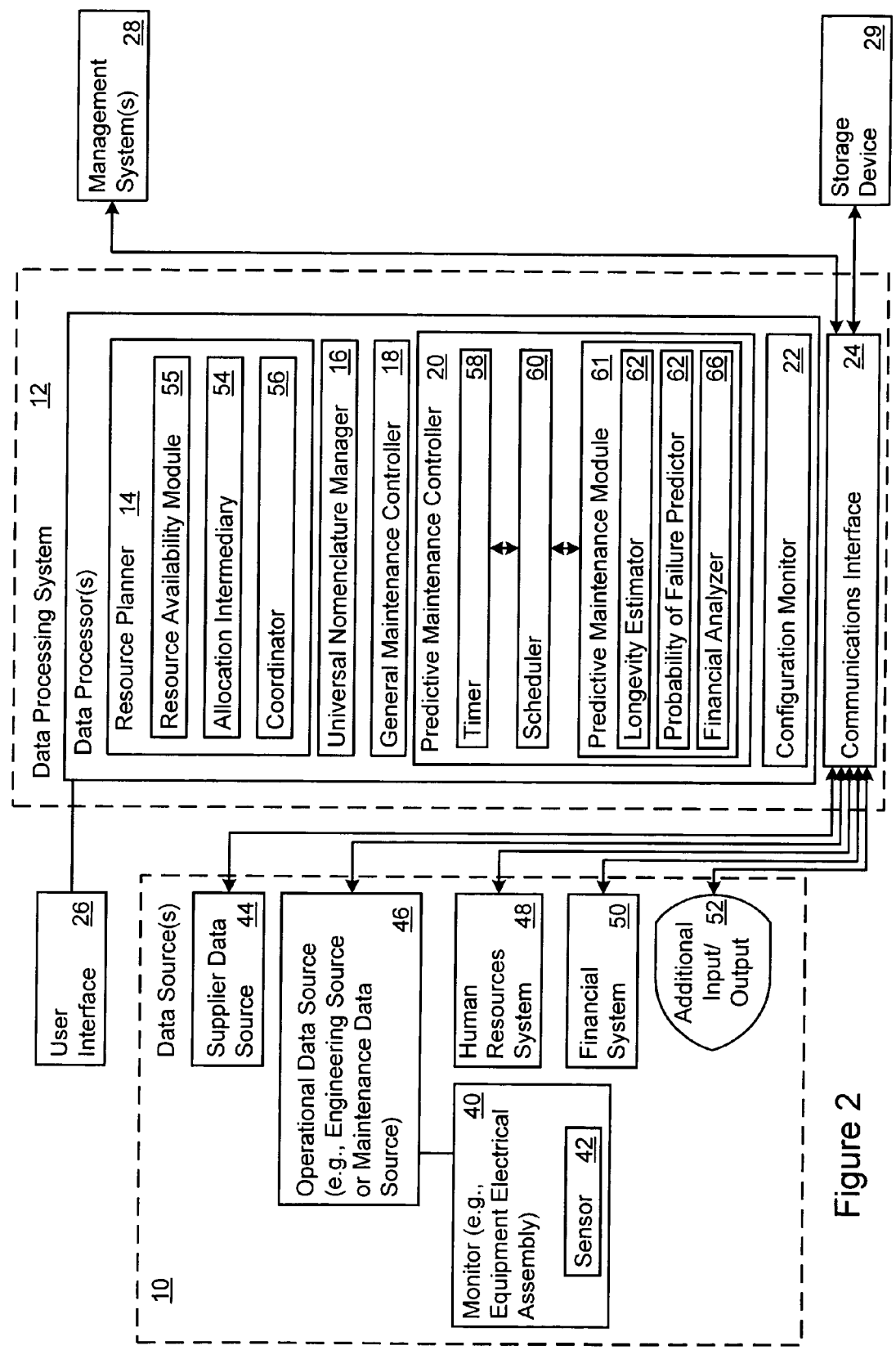
FIG. 2 is a block diagram of the system for managing maintenance that shows an illustrative embodiment of the data sources of FIG. 1.

FIG. 2 shows an illustrative example of the data sources 10 and of the data processing system 12 that may be used to practice the maintenance system 11 of FIG. 1. Like reference numbers in FIG. 1 and FIG. 2 indicate like elements.

As illustrated in the example of FIG. 2, the data sources 10 include a supplier data source 44, an operational data source 46 (e.g., an engineering source or a maintenance source), a human resources system 48, a financial system 50, any additional input/output 52, and a monitor 40. The monitor 40 may manually or automatically monitor the operational performance or longevity (e.g., time and/or operational cycle compliance) of a part, an assembly, or the equipment. For example, the monitor 40 may provide a report of assembly longevity data or part longevity data for storage in the planned maintenance data storage allocation 32. In one embodiment, the monitor 40 includes an equipment electrical assembly that monitors the performance, conducts a test, or indicates the status of an item of equipment, a component thereof, or an assembly thereof. In one configuration, the electrical assembly includes a sensor 42 that may obtain data or stored data from the item of equipment and may be integrated into the item of equipment along with the equipment electrical assembly 40.

In one embodiment, the additional input/output 52 may include, but is not limited to, a maintenance input/output device an engineering input/output device, a supervisory input/output device or another data input/output device.

As shown in FIG. 2, the predictive maintenance controller 20 comprises a predictive maintenance module 61, a timer 58, and a scheduler 60. The predictive maintenance module 61 and the timer 58 input data to the scheduler 60. The timer 58 provides present time or an elapsed duration measured with reference to the installation date of a component in a particular item of equipment.

The predictive maintenance module 61 comprises at least one of a longevity estimator 62, a probability of failure predictor 64, and a financial analyzer 66. The predictive maintenance module 61 provides a predictive maintenance requirement based on at least one of a longevity estimate, a probability of failure, and a financial analysis. The longevity 62 estimator provides a longevity estimate for an item of equipment or a component thereof based upon input data (e.g., supplier data). The probability of failure predictor 64 provides a prediction or estimate of the probability of failure a component or an item of equipment based upon input data. The financial analyzer provides an economic analysis of a potential maintenance activity to determine an appropriate maintenance plan based on input data. The predictive maintenance module 61 may obtain the input data from a number of sources including, but not limited to, one or more data sources 10, from the user interface 26 or from both data sources 10 and the user interface 26.

In one embodiment, the longevity estimator 62 provides longevity reference data (e.g., a longevity estimate) on a component or an item of equipment to the scheduler 60. Similarly, the probability of failure predictor 64 may provide probability of failure data (e.g., an estimated date of failure or breakdown) on a component or an item of equipment to the scheduler 60.

The financial analyzer 66 accesses a maintenance plan of the data processing system 12. For example, the financial analyzer accesses the planned maintenance data in the storage device 29 and may provide a cost estimate for a potential maintenance requirement based at least on one or more of the following: internal cost data on labor, consumable materials, components, assemblies, indirect costs and direct costs. Direct costs are costs or expenses that are directly associated with maintenance or repair, including parts and labor for a component. Indirect costs are costs or expenses that represent fixed capital costs, sunk capital costs, or other costs that are required to support the business entity performing the maintenance and repair. For example, indirect costs include costs for lease of a repair facility, purchasing of a repair facility, or capital improvement expenses for repair facilities. In an alternate embodiment, the supplier of labor, a supplier of consumable material and a supplier of components may provide external cost data on the planned maintenance activity. Accordingly, the financial analyzer 66 may allow the owner or operator of the equipment to veto the planned maintenance activity that is too expensive to be practical given the internal cost data, the external cost data, or both.

In one embodiment, the scheduler 60 outputs scheduling data or a maintenance plan to the resources planner 14. In turn, the resource planner 14 may output the maintenance plan, with or without modification, from the resource planner 14 via communication interface 24 for transmission to the management system 28. The resource planner 14 determines whether or not the proposed maintenance plan proposed by the schedule 60 will be adopted or modified to provide a coordinated or integrated maintenance plan. The communication interface 24 may support transmission of the maintenance plan or maintenance data consistent with the maintenance plan via the communications network (e.g., the Internet) to the management system 28.

The resource planner 14 coordinates the bringing together of required component data, worker data, tools, instructions, and other information for planned maintenance at a common geographic location where the item of equipment is or will be situated. In the illustrative embodiment of the data processing system 12 of FIG. 2, the resource planner 14 comprises an allocation intermediary 54, a resource availability module 55, and a coordinator 56. The coordinator 56 determines the priority of and integration of maintenance activities based on a predictive maintenance requirement, a configuration maintenance requirement, and a general maintenance requirement for an item of equipment. In one embodiment, the coordinator 56 comprises a reconciliation module for controlling, reconciling, and coordinating predictive maintenance requirements, configuration maintenance requirements, and general maintenance requirements. If the item of equipment is mobile, an additional data storage allocation (e.g., database) storing the location schedule of the mobile mechanical equipment is preferred to carry out the aforementioned coordination.

A resource availability module 55 contains temporal data on when corresponding resources are available for performing a prospective predictive maintenance activity. In one embodiment, the resource availability module 55 contains temporal data and related geographic data on performing prospective predictive maintenance activity. A resource availability module 55 manages one or more of the following types of data: worker data, facility data, tool data and component data. The resource availability module 55 provides prospective availability dates, prospective time intervals, or both for one or more of the following: a worker, a facility, a tool, a maintenance task (e.g., a MRO task), a component, a material, and an item of equipment. In one embodiment, the resource availability module 55 tracks worker data that includes worker identifiers, corresponding qualifications of the workers, and respective geographic locations of the workers. The allocation intermediary 54 supports the interaction of the resource planner with the scheduler of the predictive maintenance controller.

Because the provision of labor and components are coordinated, workers can work to predetermined schedules, planners can facilitate procurement of components (e.g., replacement parts) by referencing reliable forecasts of required components, additional mechanical equipment, or supplies. The data processing system 12 may foster improved availability of a component for maintenance; improved availability of functional equipment, and timely fulfillment of hiring needs of the maintainer or user of the equipment. The terms of contracts with suppliers may be more firm or certain based on the improved availability and accuracy of forecasts and other information associated with the planned maintenance data outputted by the data processing system 12. Accordingly, the predictive maintenance system of the invention is well-suited for fostering improvements in logistics in the procurement of components (e.g., parts or spare parts) and the assignment of maintenance workers at a planned maintenance time.

The universal nomenclature manager 16 manages data to identify components and materials regardless of a manufacturer, supplier, brand, or other source of identity. The universal nomenclature manager 16 facilitates the use of multiple suppliers or manufacturers for a single component to foster availability of components in the event of problems specific to a single manufacturer or region. Further, the universal nomenclature manager 16 facilitates the identification and management of interchangeable components.

Figure 3:
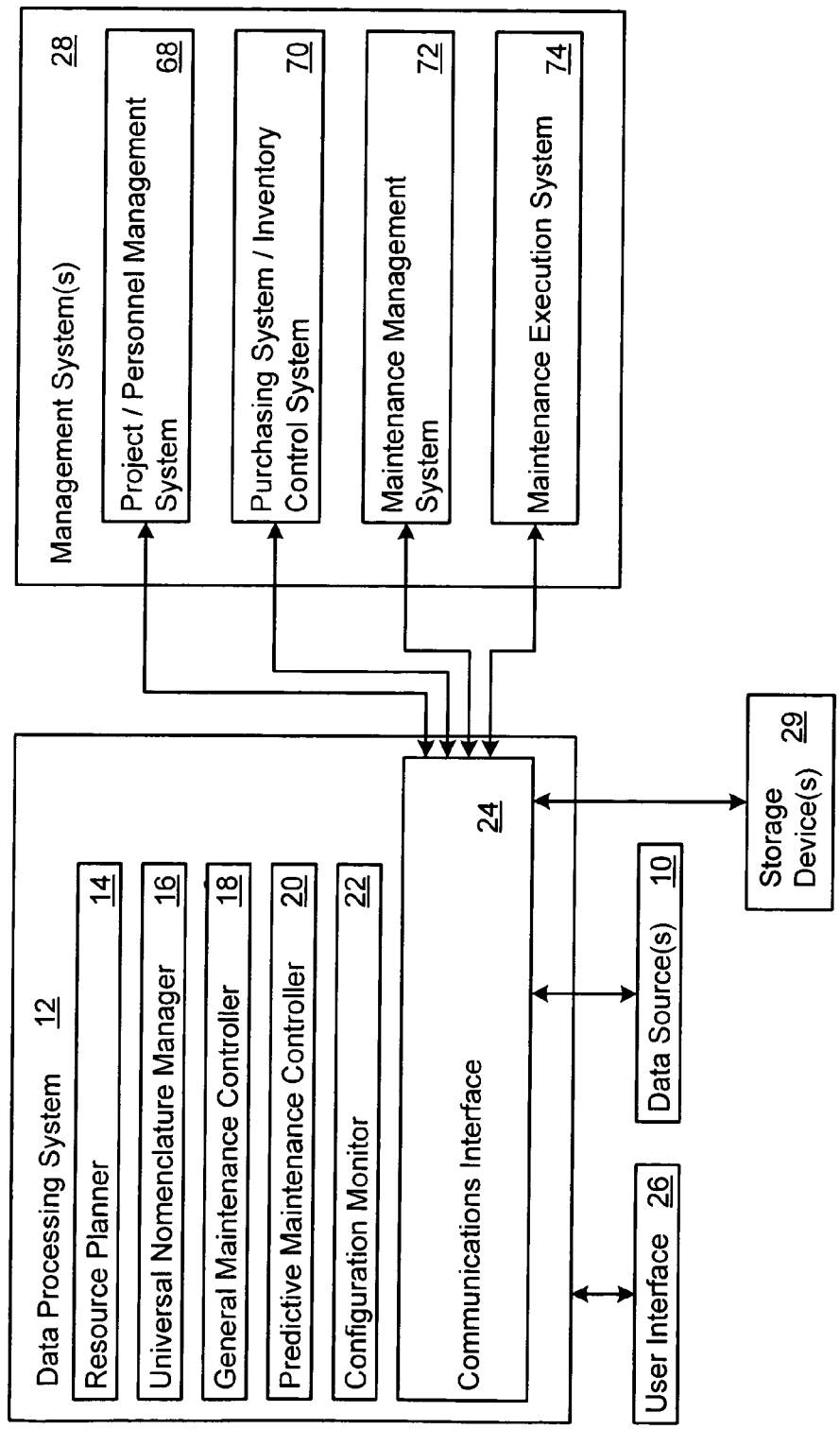
FIG. 3 is a block diagram of the system for managing maintenance that shows an illustrative embodiment of the management systems of FIG. 1.

In general, one or more management systems 28 may comprise any of the following: a purchasing system, an inventory control system, a personnel management system, an enterprise resource planning system of a supplier, an enterprise resource planning system of the operator of an item of equipment, a maintenance management system, a materials management system, and a maintenance execution system. As shown in FIG. 3, the communications interface 24 facilitates communication with one or more of the following management systems 28: a project/personnel management system 68, a purchasing system/inventory control system 70, a maintenance management system 72, and a maintenance execution system 74.

Figure 9:
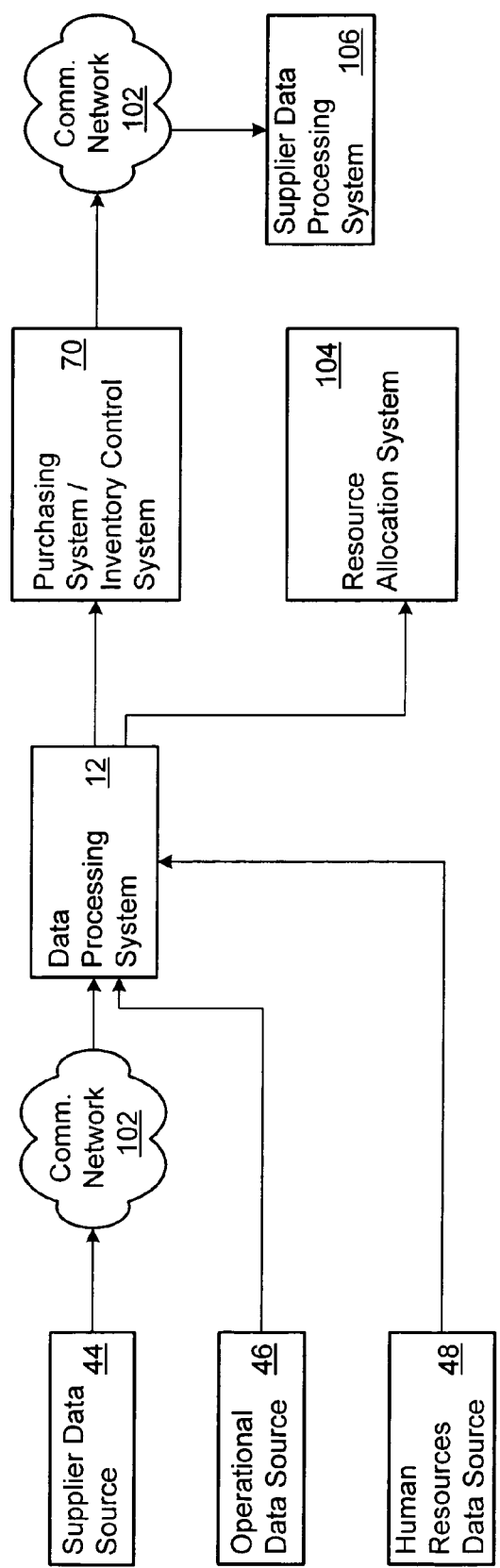
FIG. 9 is a block diagram of a system for managing maintenance in the environment of a communications system.
Figure 10:
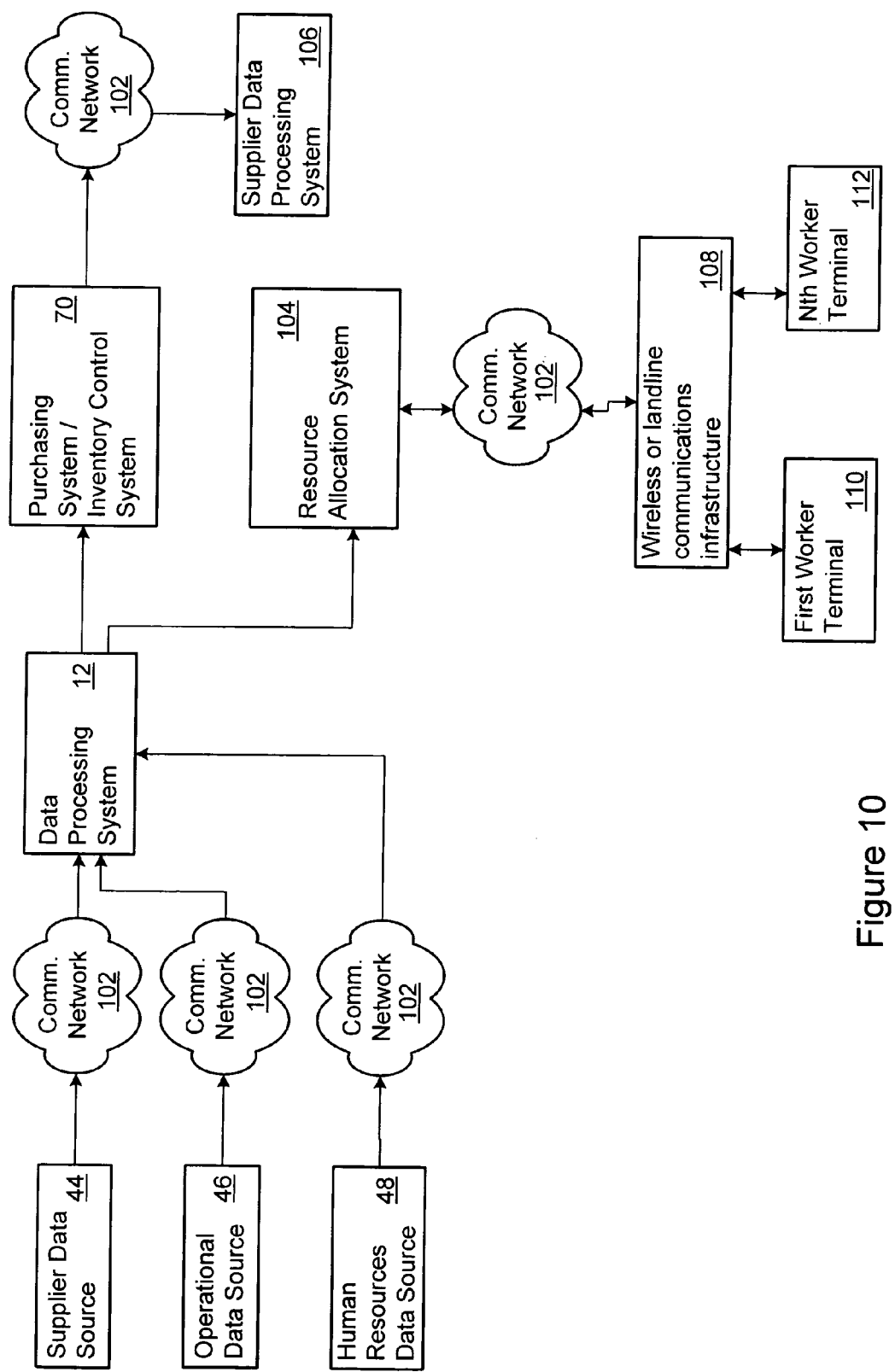
FIG. 10 is a block diagram of another embodiment of a system for managing maintenance that communicates to workers via wireless infrastructure.

Referring again to FIG. 2, the communications interface 24 and the allocation intermediary 54 of the resource planner 14 may support electronic commerce or business-to-business transactions among the operator of the equipment and various trading partners (e.g., supplier of components or repair services.) For example, the communications interface 24, the allocation intermediary 54 or both, may support a data format that is suitable for transmission of the maintenance plan to one or more management systems 28 over a communications network 102 (e.g., the Internet, as shown in FIGS. 9 and 10) via the communications interface 24. The communications interface 24 may comprise buffer memory coupled to a transceiver. The communications interface 24 may support a parallel port, a database interconnection, a serial port, or another computer port configuration.

The scheduler 60 or the resource planner 14, or both, determine a maintenance plan or schedule based on resource availability data provided as worker data, facility data, tool data and component data. The maintenance plan is a framework or scheme for performing maintenance (e.g., predictive maintenance) on the equipment. The communication interface 24 provides an interface for allowing the scheduler 60, the resource planner 14, or both to communicate the resultant maintenance plan (or data derived therefrom) over a communication network to a management system 28.

In one example, management system 28 may comprise a supplier data processing system, an enterprise resource planning system, or supplier fulfillment center, for example. The supplier data processing system may support the maintenance entity's ordering of components, materials (e.g., consumable materials), tools (e.g., test equipment or diagnostic equipment) and other resources necessary to complete predictive maintenance of the equipment.

Figure 4:
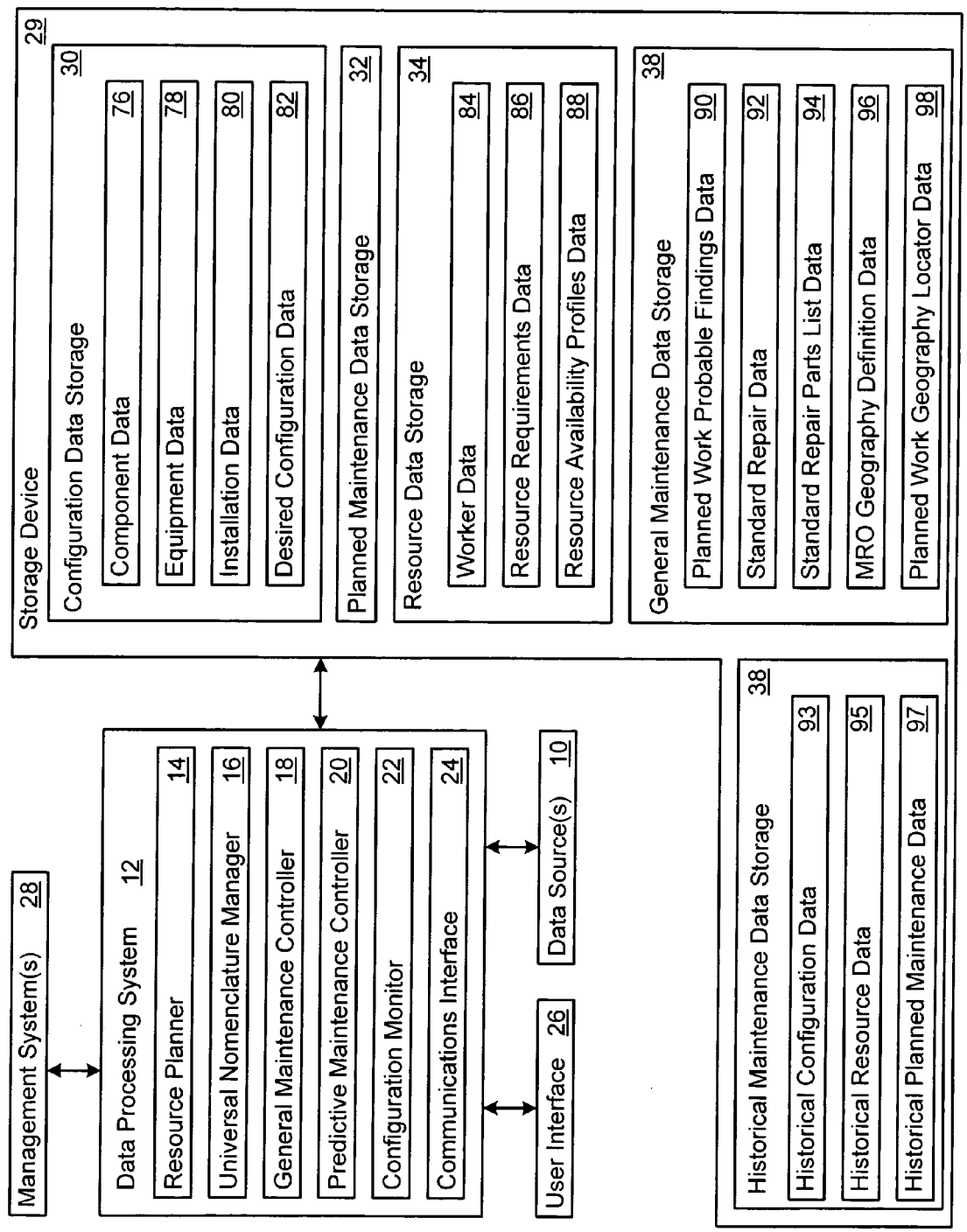
FIG. 4 is a block diagram of the system for managing maintenance that shows an example of the contents of the storage device of FIG. 1.

FIG. 4 illustrates an illustrative set of data storage allocations of a storage device 29. The data storage allocations comprise one or more of the following: a configuration data storage allocation 30, a planned maintenance data storage allocation 32, resource data storage allocation 34, a general maintenance data storage allocation 36, and a historical maintenance data storage allocation 38. In FIG. 4, the storage device 29 refers to any computer storage mechanism that supports a magnetic storage medium, an optical storage medium, an electronic storage medium, or any other suitable storage medium.

The configuration data storage allocation 30 stores configuration data which may include any of the following: component data 76, equipment data 78, installation data 80, and desired configuration data 82. In one embodiment, the configuration data storage allocation 30 comprises an actual configuration database, a desired configuration database, an upgrade requirements database, and a supervisory/historical database. The data processing system 12 supports data storage, retrieval, and queries of the databases stored in the storage device 29.

The planned maintenance data storage allocation 32 stores data related to planned maintenance or predictive maintenance, for example. The resource data storage allocation 34 stores resource data which may include any of the following: worker data 84, resource requirements data 86, and resource availability profiles data 88.

The general maintenance data storage allocation 36 stores general maintenance data which may include planned work probable findings data 90, standard repair data 92, standard repair parts list data 94, maintenance repair and overhaul (MRO) geography definition data 96, and planned work geography locator data 98.

The historical maintenance data allocation 38 stores historical data which may include any of the following: historical configuration data 93, historical resource data 95, and historical planned maintenance data 97.

With respect to the configuration data storage allocation 30, component data 76 refers to availability dates and time intervals of a component, a sub-component, an assembly, or a system for installation or maintenance activities. The component data 76 may define availability dates or time intervals of the equipment based upon one or more of the following types of information: a supplier lead times, an anticipated shipment date, an anticipated delivery date or receipt of equipment, an outstanding order, an inventory of a component, sub-component, assembly or system, an expected receipt of a component, sub-component, assembly, system, or like information.

The material data refers to data on the availability of a raw material, a consumable, a component, a provision, or another equipment-related resource concerning the performance of a maintenance activity. For example, the material data comprises: (1) a material identifier that uniquely identifies a particular material associated with a maintenance activity, (2) a geographic location indicator that indicates the location of the material identifier, and (3) a date or time interval to which the geographic location indicator corresponds.

The equipment data 78 defines the availability of a particular item of equipment. For example, the equipment data comprises: (1) an equipment identifier that uniquely identifies a particular item of equipment, (2) a geographic location indicator that indicates the location of the equipment, and (3) a date or time interval to which the geographic location indicator corresponds. The installation date 80 may be associated with corresponding components to determine a length of service of the corresponding component for determination of a predictive maintenance requirement.

The desired configuration data 82 may pertain to on one or more items of equipment. The desired configuration data 82 may define a target configuration of an item of equipment or a component for determination of a configuration maintenance requirement. The desired configuration data contains an equipment identifier (e.g., tail number of an airplane) that identifies the entire item of equipment, a part identifier that identifies a part of the item of equipment, an assembly identifier that identifies an assembly of parts of the equipment, a specification description that describes the specification of a part, and a relationship description that describes the relationship of a part to the equipment or a subassembly thereof. For example, the relationship description may include the mounting position of a part on the equipment. In one embodiment, the desired configuration data may include operating restrictions on the equipment because of the presence of a particular part or a particular arrangement of parts of the equipment.

In one embodiment, the configuration data in the configuration data storage allocation 30 comprises actual configuration that pertains to one or more items of equipment. The actual configuration data contains actual configuration data on the item of equipment that reflects an actual or present status of the equipment. The actual configuration data includes an equipment identifier (e.g., tail number of an airplane) that identifies the entire equipment, a part identifier that identifies a part of the mechanical equipment, an assembly identifier that identifies an assembly or group of parts of the equipment, a specification description that describes the specification of the part, and a relationship description that describes the relationship of a part to the equipment or a subassembly thereof. For example, the relationship description may include the mounting position of a part on the equipment. In one embodiment, the actual configuration data may include operating restrictions on the equipment because of the presence of a particular part or arrangement of particular parts on the equipment.

The actual configuration data, the desired configuration data, and the upgrade requirements data applicable to an item of equipment may vary with time. Accordingly, configuration data on a particular item of equipment may only remain valid for a limited duration. Upon or before expiration of the duration, the configuration is preferably updated. If the contents of the data storage allocations (e.g., databases) are updated with sufficient frequency to avoid outdated configuration data, the update procedure may be referred to as a real-time procedure. The real-time procedure seeks to minimize inaccuracy of the configuration data by reflecting changes to the actual configuration of the item of equipment as the changes occur with a minimal lag time thereafter. Changes to the actual item of equipment may be necessary or proper to facilitate improvement of the actual configuration. Thus, the data processing system 12 and the storage device 29 can support the coordination of maintenance activities (e.g., maintenance, overhaul or repair) in real time on an ongoing basis with the latest actual configuration data and the latest upgrade requirements.

To support real-time determination of a maintenance plan or data derived therefrom, maintenance worker, such as a technician or a mechanic who is responsible for maintaining or repairing the item of equipment, enters actual configuration data into the configuration data storage allocation during or after an inspection or servicing of the item of equipment. The inspection may involve a visual inspection, a physical inspection, a mechanical test, an electrical test, disassembly of portions of the item of equipment, or other activities that might uncover defects or nonconformities with respect to the desired configuration. The data processing system 12 updates the actual configuration data in the configuration data storage allocation as soon as possible after the inspection or the servicing of the mechanical equipment to maintain the accuracy of the actual configuration data.

With respect to the planned maintenance data storage, the data processor 12 compares the actual configuration to the desired configuration. The difference between the actual configuration and the desired configuration may be referred to as the upgrade requirement. The upgrade requirement, a maintenance plan, or data derived therefrom, may be stored in the planned maintenance data storage 32. The difference may comprise one or more of the following: components, materials, and resources. The upgrade requirement defines the departure of the actual configuration from the desired configuration and indicates the necessary actions to bring the equipment into conformity with the desired configuration. The data processor 12 determines the upgrade requirement. The data processor 12 may express the upgrade requirement in terms of (1) a component requirement (e.g., part, assembly or subassembly requirement) and (2) a human resource requirement that is required to bring the actual configuration in conformity with the desired configuration. The upgrade requirements may contain part identifiers of old parts that require updating of a particular mechanical equipment to gain compliance with the desired configuration. The component requirement is not limited to electrical or mechanical hardware. For example, the component requirement may include modifications of software features and software instructions that are associated with or integral to the functioning of the mechanical equipment. The human resource requirement may include the scheduling of one or more maintenance workers (e.g., technicians and mechanics) to install, repair, adjust, reconfigure, replace or otherwise perform a service associated with the component requirement for the mechanical equipment.

With respect to the resource data storage allocation 34, worker data 84 may comprise worker qualifications data, worker geographic location associated with corresponding workers, certifications of workers, experience of workers, worker schedules, and worker availability. The resource requirements data 86 and resource availability profiles data 88 may comprise facility data and tool data, for example. Facility data provides the availability of space for repairing, maintaining, or overhauling equipment. Further, facility data refers to infrastructure at respective facilities for performing certain types of maintenance, repair and overhaul activities on the equipment. Tool data refers to availability dates and time intervals of certain tools to complete corresponding maintenance, repair or overhaul of the equipment. A tool may refer to any device that assists a worker in performing or conducting a maintenance activity on equipment. For example, a tool may comprise a hand tool, a power tool, test equipment, diagnostic equipment, a test fixture, or the like. The general maintenance data storage allocation 36 contains general maintenance data that may be integrated with predictive maintenance requirements, configuration maintenance requirements, or both to form a comprehensive maintenance plan.

The historical configuration data storage allocation 38 retains the historical records of prior configuration alterations. The historical configuration data storage tracks historic configurations of the item of equipment and any associated failure or defect with historic configurations. A description of the failure or defect, a date of detection of the failure of defect, determined causal factors from failure analysis activities, and resolution or repair of the failure or defect are preferably noted in historical maintenance data storage allocation 38. The foregoing failure or defect data may supplement or be used to update mean-time-before failure (MTBF) data provided by the manufacturer on parts or assemblies of the equipment. In turn, the updated MTBF may be used to change the desired configuration with input from engineering over the engineering input/output device 12.

Figure 5:
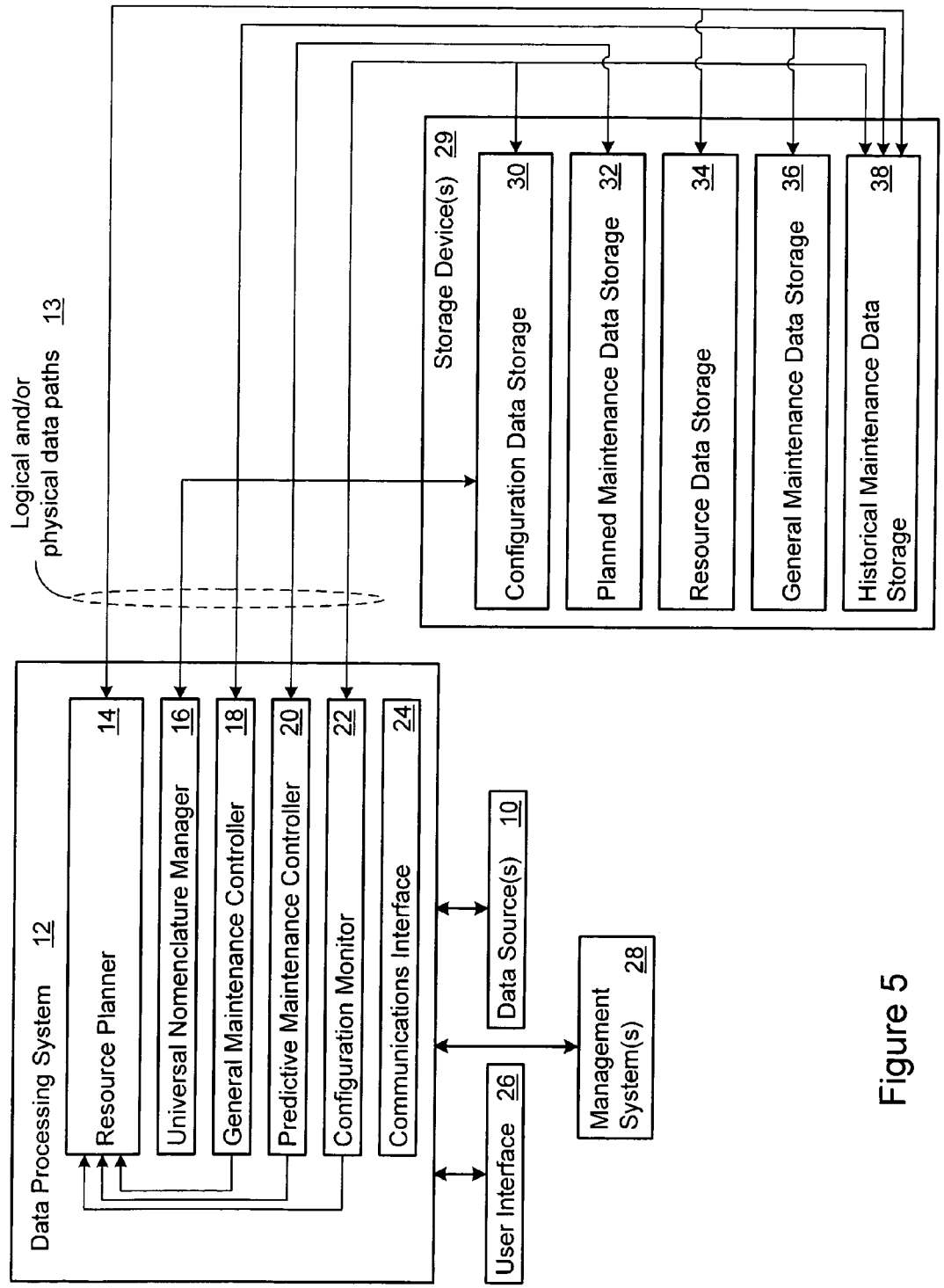
FIG. 5 is a block diagram of the system for managing maintenance that shows one embodiment of the logical and/or physical data paths between various elements of the system.

FIG. 5 is a block diagram of a maintenance system that shows an illustrative group of the logical and/or physical data paths 13 between different elements of the data processing system 12 and the storage device 29. Although FIG. 5 illustrates certain logical and/or physical data paths 13, the elements of the maintenance system may interact or communicate with one another in any manner otherwise supported by this disclosure.

In the exemplary embodiment of FIG. 5, the universal nomenclature manager 16, the general maintenance controller 18, the predictive maintenance controller 20, the configuration monitor 22, and the communications interface 24 communicate with the resource planner 14.

The resource planner 14 may communicate with the resource data storage allocation 34 and the historical maintenance data storage allocation 38. The universal nomenclature manager 16 may communicate with the configuration data storage allocation 30. The general maintenance controller 18 may communicate with the general maintenance data storage allocation 36 and the historical maintenance data storage allocation. The predictive maintenance controller 20 may communicate with the planned maintenance data storage allocation 38. The configuration monitor 22 may communicate with the configuration data storage allocation 30 and historical maintenance data storage allocation 38.

Predictive Maintenance

Any of the embodiments of the maintenance system shown in FIG. 1 through FIG. 5 may perform predictive maintenance in the following manner. As sown in FIG. 2, the communications interface 24 may collect performance data from one or more of the following: a supplier data source 44, an operational data source 46 and a human resources data source 48. In one embodiment, the communications interface 24 may collect performance data from an item of equipment where the item of equipment has a sensor 42 or a monitor 40 for feeding performance data to the communications interface 24. The communications interface 24 may analyze, format, or process the performance data into a format which is suitable for interpretation by the predictive maintenance module 61.

The predictive maintenance module 61 predicts a maintenance activity and an associated time interval for the maintenance activity based upon the performance data with respect to a defined performance standard. The combination of an identified maintenance activity and a corresponding time frame, or date for performance of the maintenance activity, represents one example of a maintenance plan.

A user may enter the performance standard data into the performance standard storage via a user interface 26 associated with the data processing system 12. The user interface 26 may accept entry into via a graphical user interface, a keyboard, a pointing device, a magnetic medium, an optical medium, or otherwise. The predictive maintenance module 61 manages the storage and retrieval of at least one performance standard in the planned maintenance data storage 32 or the configuration data storage 30.

As seen in FIGS. 2, 4 and 5, the predictive maintenance module 61 may access component data 76 in the configuration data storage 30 or elsewhere. The component data 76 may comprise a component identifier and other affiliated information, such as whether particular component identifier complies with the performance standard. Further, the configuration data storage 30 may contain any of the following information: a preferable future date for performing predictive maintenance; a time-frame for performing predictive maintenance; a preliminary schedule for scheduling predictive maintenance; an assembly identifier for the identifying an assembly associated with a component, and item identifier for identifying an item of equipment associated with the component, and any other applicable data on a component or an end item of equipment. Information on tentative time frames for performing predictive maintenance may be refined by the scheduler 60, the resource planner 14, or both. Information on relationships between revisable components and related sub-components, a related assembly, or a related system may be used to define the requisite scope of the revision of the maintenance plan.

The predictive maintenance controller 20 may manage the storage of reference performance data on a component of an assembly, a system, an assembly, or the equipment consistent with at least one performance standard. The predictive maintenance controller 20 accepts the collected or observed performance data on the component, an assembly, or equipment and performs a comparison against a reference performance data standard based upon a component, an assembly, or the equipment. If the collected or observed performance data deviates by a material amount or significant amount from a reference performance data of the performance standard, then any affected component, assembly, system or sub-component is identified as suspect. A suspect item requires attention or predictive maintenance to be scheduled. For example, if the collected performance data is noncompliant with the reference performance data of the performance standard, based upon the equipment as a whole, the affected components or assembly of the equipment may be flagged as suspect components. In one embodiment, a user may clear a suspect status by entering an acknowledgement via the user interface 26.

Where the reference performance data refers to the equipment, as a whole, the performance standard relates to the equipment as whole. The identification of components to be replaced or maintained in that equipment may be based upon historical relationships between the particular deficiencies in the collected performance data and likely or probable suspected components.

The predictive maintenance controller 20 determines a preliminary maintenance schedule for performing predictive maintenance. The preliminary maintenance schedule comprises a preliminary proposed date or a preliminary proposed time interval for performing a maintenance activity (e.g., maintenance, repair or overhaul, which may be referred to as MRO) on a suspect sub-component, suspect component, suspect assembly, suspect system, or suspect item of equipment.

In one embodiment, referring to FIG. 2, the scheduler 60 accepts input from both the predictive maintenance module 61 and the resource availability module 55. The scheduler 60 may accept the input of suspect component data and a preliminary maintenance schedule derived from the comparison of the predictive maintenance module 61 of collected performance data to reference performance data. The scheduler 60 accepts the input of the preliminary proposed date or preliminary proposed time interval for predictive maintenance and determines a resultant date or a resultant time interval for performing predictive maintenance based upon a consideration of the resource availability data as related to the suspect data. The scheduler 60 preferably reconciles the preliminary maintenance schedule with temporal resource availability of one or more of the following: workers, facility, tools, components, materials (e.g., a consumable material or a raw material), and equipment.

The scheduler 60 may revise the preliminary maintenance schedule (e.g., the preliminary proposed maintenance date or time interval) to a resultant maintenance schedule (e.g., a resultant maintenance date or time interval) if at least one of the resources is not available consistent with the preliminary maintenance schedule. However, the scheduler 60 may consider substitution of alternate components prior to revision of the preliminary maintenance schedule. Accordingly, the resultant maintenance schedule may be the same as the preliminary maintenance schedule, if all of the resources are available per the preliminary maintenance plan or if an alternate component can be substituted to preserve a preliminary maintenance schedule. The resultant maintenance schedule assures availability of all necessary resources to perform a maintenance activity on the resultant date or at the resultant time interval.

The resource planner 14 coordinates the maintenance schedule of the predictive maintenance requirement with one or more of the following: any general maintenance requirement and any configuration maintenance requirement for the same item of equipment or a similar item of equipment. For example a similar items of equipment may share the same component that requires replacement or may require servicing at a particular facility. The maintenance plan or data derived therefrom may be communicated to a management system 28 in accordance with several alternate techniques. Under a first technique, subject to the approval of the resource planner 14, the scheduler 60 may communicate the maintenance plan via the communications interface or via the resource planner and the communications interface 24. Under a second technique, the resource planner communicates a maintenance plan or data derived therefrom to a management system 28 via a user interface 26.

To schedule predictive maintenance, the predictive maintenance controller 20 may contact the resource planner 14 to determine whether components, materials, workers, and other resources required for the upgrade are, will be, or can be available at a scheduled maintenance time and scheduled maintenance location. The predictive maintenance controller 20, the resource planner 14, or both maintain the availability and reliability of the equipment, to meet a financial objective, to comply with safety requirements, or for other reasons. The resource planner 14 plans for the availability of one or more workers, facilities, infrastructure, components, or other resources for a time interval at a common geographic location to facilitate maintenance, repair or overhaul activity.

Configuration Maintenance

In any of the embodiments of the maintenance system shown in FIG. 1 through FIG. 5, configuration maintenance may be performed in the following manner.

At regular or scheduled intervals, the configuration monitor 22 monitors the existing configuration of an item of equipment to determine whether the item of equipment deviates from a target configuration. The target configuration may be stored in the configuration data storage allocation 30, for example. If the existing configuration differs from the target configuration, the configuration monitor 22 determines that configuration maintenance is needed for the subject item of equipment. Accordingly, once the configuration monitor 22 determines that configuration maintenance is needed for a particular item, the configuration monitor 22 determines the configuration maintenance requirement. The configuration maintenance requirement may be forwarded to the resource planner 14 for coordination of maintenance activities. The coordination may include integration of the configuration maintenance requirement or another maintenance requirement.

To schedule configuration maintenance, the configuration monitor 22 may contact the resource planner 14 to determine whether components, materials, workers, and other resources required for the upgrade to the target configuration are, will be, or can be available at a scheduled maintenance time and scheduled maintenance location. The existing configuration is updated to the target configuration to maintain the availability and reliability of the equipment, to meet a financial objective, to comply with safety requirements, or for other reasons.

General Maintenance

Any of the embodiments of the maintenance system shown in FIG. 1 through FIG. 5 may provide general maintenance for an item of equipment in the following manner.

The general maintenance controller 18 supports maintenance (i.e., one or more general maintenance requirements) that does not fall under predictive maintenance and configuration management. For example, the general maintenance supports maintenance requirements for one or more of the following reasons: (1) unexpected failure or impairment of an item of equipment or a component thereof, (2) a defect discovered incidental to an inspection of an item of equipment or a component thereof, (3) a defect discovered incidental to a test of an item of equipment or a component thereof, (4) damage to a component or impairment of the item of equipment for any reason, including accidental damage, and (5) any unplanned maintenance requirement.

The general maintenance controller 18 supports catch-all maintenance activities as a fallback mechanism where the predictive maintenance requirements and the configuration maintenance requirements may not have initially allocated the necessary resources necessary to perform the desired maintenance (e.g., make a repair). Nevertheless, the general maintenance controller 18 coordinates with the resource planner 14 in a manner that may dynamically reallocate planned resources from secondary items of equipment to meet an unexpected maintenance contingency for a primary item of equipment. Further, the general maintenance controller may reserve a pool of resources for unexpected maintenance activities based upon historical patterns of maintenance activity for particular items of equipment or otherwise. The historical patterns of maintenance activity may be stored as historical maintenance data 97 in the historical maintenance data storage 38, as shown in FIG. 4.

Integrated Maintenance

The resource planner 14 receives one or more of the following: configuration maintenance requirements from the configuration monitor 22, predictive maintenance requirements from the predictive maintenance controller 20, general maintenance controller 18, procurement data on component availability, human resources data on human resources availability, operational data on maintenance resource availability, input data, and any other data associated with maintenance.

The resource planner 14 coordinates and harmonizes one or more of the following: configuration maintenance requirements, predictive maintenance requirements, and general maintenance requirements. In one example, predictive maintenance and configuration maintenance activities may be combined into a single maintenance session, rather than bringing in an item of equipment in for repeated maintenance. For instance, the predictive maintenance controller determines what predictive maintenance is scheduled for the particular item and whether the existing configuration can be updated to the target configuration during the scheduled maintenance, or at some other time.

Independent from the coordination of predictive maintenance and configuration management, the resource planner 14 may integrate or accumulate the requirements for components for one or more items of equipment to place aggregate orders for required components with one or more suppliers via management systems 28. Accordingly, the resource planner 14 may support centralizing of the acquisition of components and materials to drive the acquisition of larger volumes of components and lower costs than would otherwise be possible.

Figure 6:
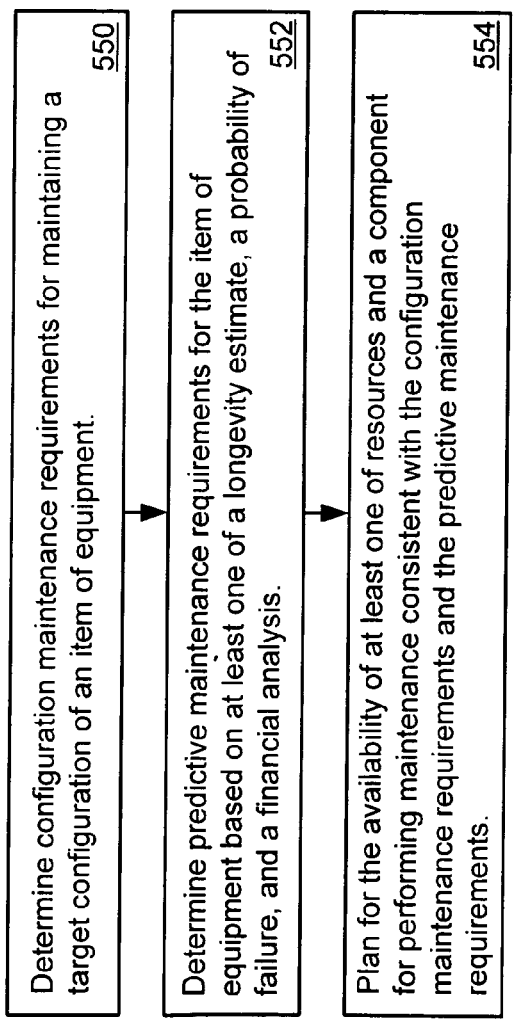
FIG. 6 is flow chart of a method for managing the maintenance in accordance with the invention.

FIG. 6 shows a method for managing the maintenance of an item of equipment in accordance with the invention. The method of FIG. 6 begins with step S50.

In step S50, the data processing system 12 or the configuration monitor 22 determines a configuration maintenance requirement for maintaining a target configuration of an item of equipment. In one embodiment, the configuration maintenance requirement may be determined in accordance with the following procedure. First, the data processing system 12 supports establishing the target configuration of the item of equipment based on a design objective of the item of equipment. The design objective may be based on at least one of a safety concern, a regulatory concern, reliability, and performance. Second, the configuration monitor 22 evaluates an actual configuration of the item of equipment. Third, the data processing system 12 determines if the actual configuration complies with the target configuration. Fourth, if the actual configuration is noncompliant, the configuration monitor 22 or the data processing system 12 establishes the configuration maintenance requirement to maintain the target configuration is defined.

In step S50, the target configuration may be updated based on engineering change, to facilitate compliance with a regulatory requirement, or for another reason. For example, an engineering change may be entered via a data source 10 or via the user interface 26.

In step S52, the data processing system 12 or the predictive maintenance controller 20 determines a predictive maintenance requirement. The predictive maintenance requirement for the item may be determined based on one or more of the following: a longevity estimate, a probability of failure, and a financial analysis. The longevity estimate and the probability of failure may apply to a component of an item of equipment or a particular item of equipment. The financial analysis may apply to one or more of the following: maintenance activity, a component, and an item of equipment.

Step S52 may be carried out in accordance with various alternate procedures. Under a first procedure, the determination of a predictive maintenance requirement comprises estimating longevity of a component based on a historical longevity of at least one of the component and an analogous component. The determining of a predictive maintenance requirement may be based upon estimating a remaining life span of a component by determining a usage time span between an installation date of the component and a subsequent date, and deducting the usage time span from the longevity for the corresponding component. Under a second procedure, the determination of the maintenance requirement comprises estimating a probability of failure of a component based on a historical probability of failure of at least one of the component and an analogous component. Under a third procedure, the determination of the maintenance requirement comprises estimating a financial impact of a component based on a historical impact of at least one of the component and an analogous component. Under a fourth procedure, the data processing system 12 or the predictive maintenance controller 20 evaluates tracked performance data on at least one of a particular component and the item of equipment with respect to a defined performance standard. Based on the evaluation, the data processing system 12 or the predictive maintenance controller 26 predicts at least one required maintenance activity.

In step S54, the data processing system 12 or the resource planner 14 plans for the availability of at least one of resources and a component for performing maintenance consistent with the configuration maintenance requirement and the predictive maintenance requirement.

In general, step S54 may comprise scheduling and bringing together at least two of the following resources at a specific time and place: a requisite component, technical instructions, supporting equipment, acceptance criteria and procedures, tools, and repair personnel. For example, step S54 includes obtaining the component for the target configuration and scheduling human resources consistent with availability of the component. Further, the data processing system may establish a universal representation of components to facilitate at least one of the acquisition of components from multiple sources, interchangeability of components, and tracking of component utilization. The scheduler 60, the resource planner 14 or both may participate in scheduling and bringing together of resources in a coordinated manner consistent with a maintenance plan.

In step S54, the planning of the resource planner 14, the scheduler 60 or both, may be accomplished in accordance with various alternative techniques or a combination of various alternate techniques. Under a first technique, the planning involves scheduling performance of the required maintenance activity at a defined respective time based upon a prediction of the predictive maintenance requirement. For example, the predictive maintenance controller 20 may determine a predictive maintenance requirement. The resource planner 14 may coordinate the predictive maintenance requirement with other maintenance activity for the item of equipment. Under a second technique, the planning involves scheduling performance of the required maintenance activity based on the configuration maintenance requirement. For example, the configuration monitor 22 may determine an upgrade requirement for upgrading the actual configuration to the target configuration if the actual configuration is noncompliant. The resource planner 14 may coordinate the upgrade requirement with other maintenance activity for the item of equipment. Under a third technique, the planning involves planning for the acquisition of at least one of the resources and the component consistent with the configuration maintenance requirement of step S50 and the predictive maintenance requirement of step S52. Under a fourth technique, the planning involves planning for the delivery of at least one of the resources and the component for a time interval at a common geographic location.

The planning of maintenance, repair and overhaul activities of step S54 of FIG. 6 may be executed in accordance with several alternative techniques that are not mutually exclusive. In accordance with a first technique, the planning of step S54 includes procuring a required part for the desired configuration and scheduling human resources consistent with availability of the required part. In accordance with a second technique, step S54 includes procuring the required assembly for the configuration and scheduling human resources consistent with the availability of the required assembly. In accordance with a third technique, step S54 includes providing part level data on the mechanical equipment to a user via an input/output device (e.g., maintenance input/output device 10) for a given point in time within a usable life of the mechanical equipment. In accordance with a fourth technique, step S54 includes providing a serial number of a component of the mechanical equipment at any given point in time for a given point in time within its usable life to manage the at least one of the safety, reliability, and performance. In accordance with a fifth technique, step S54 may include scheduling and bringing together at least two of the following items at a specific time and place: requisite parts, technical instructions, supporting equipment, acceptance criteria and procedures, tools, and repair personnel.

Figure 7:
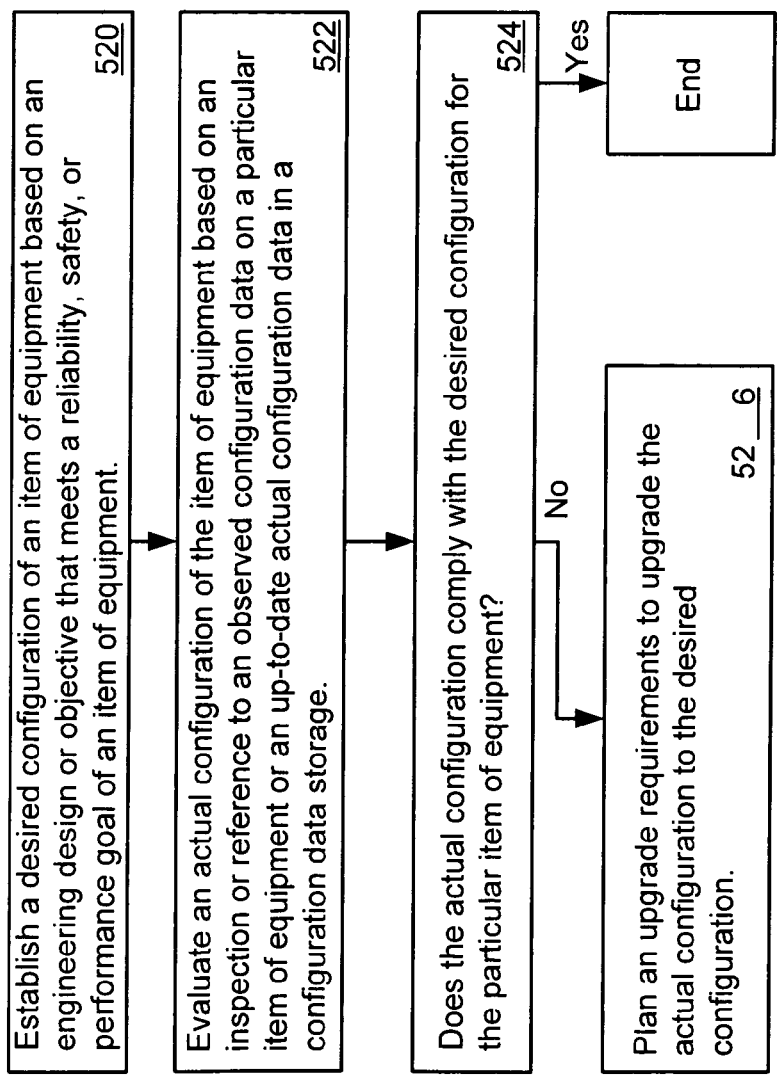
FIG. 7 is flow chart of a method for managing the maintenance with respect to configuration maintenance in accordance with the invention.

FIG. 7 shows step S50 in greater detail than FIG. 6. For example, step S50 of FIG. 6 may comprise steps S20 through S26 of FIG. 7.

In step S20, a desired configuration of an item of equipment is established based on an engineering design or objective that meets a reliability, safety, or performance goal of the item of equipment. For example, the engineering design may be configured to meet a reliability goal based on statistical failure data on parts, assemblies, or the entire item of equipment. One or more data sources 10 may provide input information or desired configuration data for a particular item of equipment.

In one embodiment, the user of the engineering input/output device may wish to update the previously desired configuration with a current desired configuration because of an engineering change. A user of the engineering input/output device (e.g., a computer work station) enters a desired configuration of the mechanical equipment into the configuration data storage allocation (e.g., desired configuration database) based on compliance with one or more of the following criteria: technical specifications, reliability, availability of equipment, safety regulations, regulatory requirements, and performance requirements. In one example, the user may enter an update of the desired configuration into the engineering input/output device to foster compliance with a new technical standard. In another example, the desired configuration may be updated on regular basis after an evaluation of reliability feedback on the item of equipment, an assembly thereof, or a part thereof. In yet another example, a user of the engineering input/output device may establish the desired configuration based upon operational performance of a part, an assembly, a component, or an entire mechanical equipment.

An update to the desired configuration may involve replacing an old part having a lesser longevity with a substituted part having a greater longevity. Likewise, an update to the desired configuration may involve replacing an old assembly having a lesser longevity with a substituted assembly having a greater longevity.

In step S22, an actual configuration of the item of equipment is evaluated based on an inspection or reference to an observed configuration data on a particular item of equipment or an up-to-date actual configuration data in the configuration data storage 30. In one embodiment, the configuration data storage allocation 30 comprises an actual configuration databases. The actual configuration database may be referred to as an as-maintained database because the database generally indicates the as-maintained or current condition of the item of equipment. An actual configuration database may be considered up-to-date if an inspection (of the particular item of equipment) was recently conducted within a maximum time interval from the present time. The actual configuration may be determined or verified based on disassembly and inspection of at least a portion of the particular item of equipment. A user of the maintenance input/output device (e.g., computer work station) enters an actual configuration of the item of equipment into the actual configuration database based on a physical inspection, a visual inspection, a test of the mechanical equipment, or reference to an up-to-date actual configuration database.

In step S24, the data processor 30 determines if the actual configuration complies with the desired configuration for the item of equipment. For example, the data processing system 12 or the configuration monitor 22 determines compliance based upon the logical and physical configuration of the item of equipment expressed as configuration data with respect a particular time. The data processing system 12 retrieves records of configuration data from the configuration data storage 30. For example, the data processing system 12 retrieves records of configuration data from the actual configuration database and the desired configuration database that are associated with the same item of equipment. The configuration data is generally time sensitive. The actual configuration and the desired configuration may be associated with time stamps to facilitate an evaluation of the latest condition of the item of equipment. The time stamps may indicate absolute time or a relative time relationship between the actual configuration and the desired configuration data.

The data processing system 12 may query or search the configuration data storage allocation (e.g., actual configuration database and the desired configuration database) by equipment identifier, assembly identifier, or part identifier to retrieve records for the same mechanical equipment. The records may be organized as files or another suitable data structure. Once one or more records for the item of equipment are retrieved, the data processing system 12 may compare data records on a record-by-record basis, where the compared records of configuration data are associated with substantially the same time period. The data processing system 12 identifies and flags differences in the physical and logical configuration of the mechanical equipment between actual configuration data and the desired configuration data associated with the same time period.

If the data processing system 12 determines that the actual configuration does not comply with the desired configuration, the method continues with step S26. However, if the data processor 30 determines that the actual configuration does comply with the desired configuration, the method ends with step S28.

In step S26, the data processing system 12 or the configuration monitor 22 plans upgrade requirements to upgrade the actual configuration to the desired configuration if the actual configuration is noncompliant. The data processing system 12 may determine the upgrade requirements by comparing the actual configuration to the desired configuration with regards to physical, logical, and time characteristics associated with the actual configuration and the desired configuration. For example, the data processing system 12 may identify a component (e.g., part or subassembly) of the item of equipment that is noncompliant (physically, logically or temporally) with the desired configuration. The identified noncompliant component may be stored in the planned maintenance data storage 32, the configuration data storage allocation on elsewhere along with an associated equipment identifier for the particular item equipment. Further, the upgrade requirements or configuration maintenance requirement may contain requisite labor requirements, modification instructions, supporting tool and equipment information, and acceptance criteria to install the identified noncompliant component and achieve the desired (i.e., upgraded) configuration.

The configuration monitor 22 may send the configuration maintenance requirement to the resource planner 14 or coordinator 55. The configuration maintenance requirement may include identified part number, a requirement date, and other informational elements required to achieve the upgrade configuration, or both to the materials management system 36. Following step S26, the method may continue with step S54 of FIG. 6.

In step S54 of FIG. 6, planner 14 or coordinator 55 may coordinate or reconcile one or more of the following: predictive maintenance requirements, configuration maintenance requirements, and general maintenance requirements. The configuration maintenance requirement may include scheduling data and planning data for bringing together resources, such as the requisite parts, tools, equipment for support of the effort, modification instructions for the human resources, acceptance criteria with testing equipment and repair personnel at a specific time and place to complete upgrade requirements to achieve the desired configuration.

Figure 8:
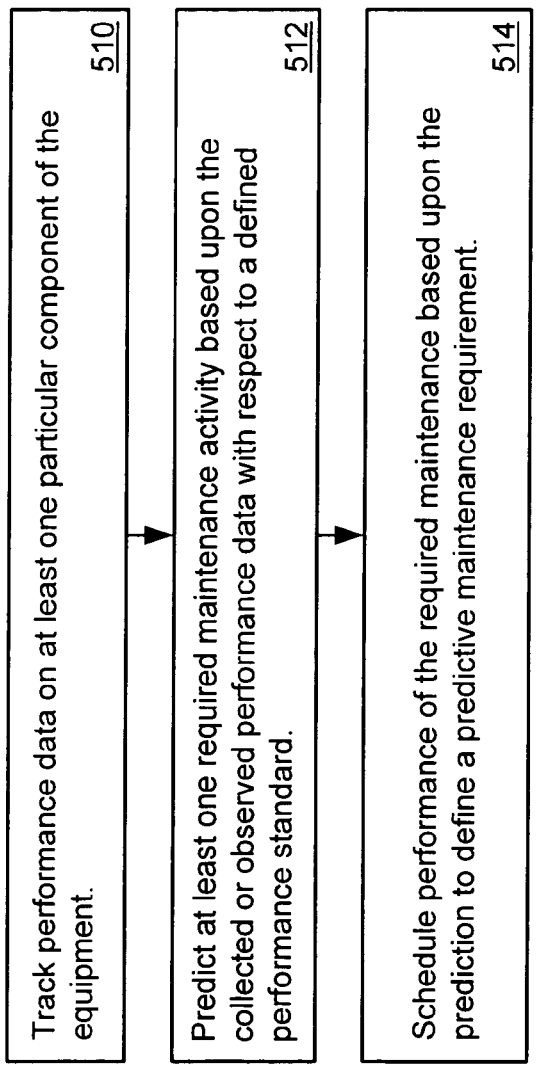
FIG. 8 is flow chart of a method for managing the maintenance with respect to predictive maintenance in accordance with the invention.

FIG. 8 shows one illustrative set of procedures for carrying out step S52 of FIG. 6. The method of FIG. 8 begins in step S10.

In step S10, performance data is tracked on at least one particular component of the equipment. For example, the data processing system 12 may collect or gather performance data on a component of the equipment, an assembly of components, or the equipment as a whole. The data processing system 12 may gather or collect performance data from an operational data source 46 or a human resources data source 48. The operational data source 46 may represent a monitor or a sensor associated with the equipment for measuring a particular component, an assembly, or the performance of the equipment as a whole. In the method of FIG. 8, the particular component may be defined based on its relationship to other components the mounting position or geographic position of the particular component on the equipment and the context of the use of the particular component.

The human resources data source 48 may be associated with workers that enter data into a database or a user interface 26 on the performance of a component, an assembly, or on the equipment as a whole. The operational data on the equipment that is entered via a user interface (e.g., 26) or provided by the human resources data source 48 may be gathered by inspection of one or more of the following: sensors, monitors or other inspection of the equipment. The observed or collected performance data or operational data may be provided by the operational data source 46, the human resources data source 48, or both.

In step S12, the data processing system 12 predicts at least one required maintenance activity based upon the collected or observed performance data with respect to a defined performance standard. For example, the predictive maintenance controller 20 of the data processing system 12 predicts at least one required maintenance activity if the performance data indicates that a defined performance standard has not been met. The defined performance standard may be defined such that noncompliance indicates that predictive maintenance is required or that predictive maintenance is necessary at some future date or over some future time interval to achieve a certain reliability or availability of the equipment for productive use. In one embodiment, the performance standard is defined as a measurable achievement of a required specific task within limits established by design calculations or in-service observations. A defined performance standard may be based on one or more of the following: a compliance factor, a safety factor, a quality factor, an economic factor, and any other suitable factor. The predictive maintenance controller may store performance standard data and component data to compare to the collected or observed performance data from the data sources 10.

In step S14, the data processing system 12 schedules performance of the required maintenance activity based upon the predicting to define a predictive maintenance requirement. The predictive maintenance requirement may comprise one or more of the following: a predictive maintenance activity, a time frame or date for performing the predictive maintenance activity, one or more components, and resources. The scheduler 60 of the data processing system 12 may schedule performance of the required maintenance by considering the component data identifier, the maintenance identifier and any associated maintenance date as an input to the scheduler 60.

The resource availability module 55 may provide availability data to one or more of the following inputs to the scheduler 60: worker data, facility data, tool data, and component data. In one embodiment, the resource availability module 55 provides the availability of a component, a facility, a tool, a worker, an assembly and the equipment to perform maintenance at a perspective date and at a perspective location.

Following step S14, the scheduler 60 may facilitate communication of the predictive maintenance requirement to the resource planner 14 or the coordinator 56. The method may continue with step S54 of FIG. 6. The coordinator 56 may coordinate the following: predictive maintenance requirements, configuration maintenance requirements, and general maintenance requirements to form a resultant maintenance plan. The communication interface 24 may communicate the resultant maintenance plan to a management system 28 (e.g., resource allocation data processing system) via a communications network. In one example, management system 28 may contact a worker, a manager of a facility or another manager of a resource to coordinate the availability of resources necessary to meet or comply with the resultant maintenance plan.

FIG. 9 and FIG. 10 show illustrative examples of how a data processing system 12 may be used in conjunction with a communication network 102 to integrate various aspects of predictive maintenance in accordance with the invention.

In FIG. 9, a data processing system 12, the operational data source 46, the human resources data source 48, the resource allocation system 104, and the purchasing system 70, may be co-located at a common site or in close proximity to one another.

In contrast, the supplier data source 44 may communicate with the data processing system 12 over a communication network 102. The supplier data source 44 may be located at a supplier site. A supplier site refers to any site that is owned or controlled by the supplier of a component, an assembly, a system or the equipment. Similarly, a supplier data processing system 106 (e.g., an order fulfillment center) may be located at the supplier site. The purchasing system 70 communicates with the supplier data processing system 106 over communication network 54. The communication network 102 may comprise the Internet and intranet, a communication system that supports a switched circuit connection, a communication system that supports a virtual connection, a data packet network, or another suitable telecommunication interconnection.

The resource allocation system 104 may facilitate communications with workers for performing maintenance. The resource allocation system 104 may also facilitate the distribution of components supplied by the supplier internally within a maintenance provider (e.g., an MRO organization). For example, the resource allocation processing system 104 may support the logistics involved with distributing inventory of the maintenance organization internally to multiple (maintenance, repair or overhaul) facilities located in geographically disparate or widely separated regions. Accordingly, resource allocation system 104 may consider a transportation cost, freight cost, custom duties, scheduling of shipments, packaging of shipments, and other activities which are necessary to insure that timely and accurate provision of material, tools and the availability of workers.

The resource allocation system 104 assures that repairs may be carried out and maintenance may be carried out without disruption from the unavailability of a qualified worker, a suitable facility, a requisite tool, a requisite component, a requisite consumable or any other information within the time frame of scheduled by the scheduler 60 for performance of the predictive maintenance.

In FIG. 10, the data processing system 12 is coupled to at least one of a resource allocation data processing system 104 and a supplier data processing system 106 via a communications network 102. Like reference numbers in FIG. 9 and FIG. 10 indicate like elements. The communications network 102 may refer to the Internet, an intranet, a data packet network, a public switched telephone network, a circuit-switched telecommunications network, or some other telecommunications network.

The supplier data source 44, the operational data source 46 and the human resources data source 48 communicate with the data processing system 12 over one or more communication network 102. The data processing system 12, the purchasing system 70 and the personnel management system may be co-located. The purchasing system 70 preferably communicates with the supplier's data processing system 106.

The data processing system 12 supports electronic communication with the supplier data source 44. The electronic communication may facilitate reduced costs in maintaining one or more items of equipment through the availability of useful information on at least one of maintenance, repair, or overhaul (e.g., MRO) of equipment. For example, useful information may include performance data or manufacturing data. Performance data or manufacturing data may be made available to the data processing system 12 to foster determination of an accurate preliminary schedule or resultant schedule for predictive maintenance on the equipment.

The purchasing system supports communication with the supplier data processing system 106, such as a supplier order fulfillment center. Communication between the purchasing system 70 and the supplier data processing system 106 may be automated to facilitate the acquisition of component, an assembly of components, of system of components, or other materials to meet planned maintenance activity or maintenance requirements.

The operator or user of the equipment may reduce the downtime for the equipment by predicting potential failures of the equipment or breakdowns of the equipment in advance of such breakdowns or failures actually occurring. Maintenance activities are preferably performed in a proactive manner, as opposed to, a reactive manner after a defect or deficiency in the equipment has been identified through an inspection. The communication network 102 of FIG. 10 supports a distributed entity or maintenance provider that manages predictive maintenance of the equipment. A distributed entity or maintenance provider may have human resources (e.g., maintenance workers) and components of equipment that may be located at different geographic locations. Further, the equipment may be mobile or portable with geographic locations that change over time during normal use of the equipment (e.g., where the equipment represents a passenger airplane). The data processing system 12 (e.g., the resource planner 14) may use the preliminary schedule and the resource availability data provided as worker data, facility data, tool data, and component data to generate a resultant schedule or planned maintenance plan for performing predictive maintenance on the equipment. The resultant maintenance plan may comprise a scheme that includes one or more of the following elements: a predictive maintenance requirement, a configuration maintenance requirement, and a general maintenance requirement. The communication interface 24 provides an interface for allowing the data processing system 12 to communicate the resultant maintenance plan over a communication network 102 to a supplier data processing system 106, a resource allocation data processing system 104, or the like.

The supplier data processing system 106 may comprise an enterprise resource planning system or supplier fulfillment center, for example. The supplier data processing system 106 may support the maintenance entity's ordering of components, materials (e.g., consumable materials), tools (e.g., test equipment or diagnostic equipment) and other resources necessary to complete predictive maintenance of the equipment.

Referring to FIG. 10, the resource allocation system 104 may communicate with a wireless or landline communications infrastructure 108 via a communication network 102. The wireless or landline communication infrastructure 108 may be associated with the first worker terminal 110 through an nth worker terminal 112. The worker terminals (110, 112) represent electronic terminals of the workers who are responsible for maintaining the equipment. For example, each worker terminal (110, 112) may represent a mobile phone, a mobile terminal with a display, a pager, a personnel digital assistant, or another communications device.

In one embodiment, the worker terminals (110, 112) and the wireless communications infrastructure (108) supports a two-way messaging interface. Accordingly, the workers can interact with the resource allocation system to provide real time availability information and to check on future assignments of planned maintenance.

The foregoing description of the method and system describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

What is claimed is:

1. A method of managing maintenance activities for at least one item of equipment, the method comprising:
   determining a configuration maintenance requirements for maintaining a target configuration of an item of equipment;
   including establishing the target configuration of the item of equipment based on a design objective of the item of equipment, wherein the design objective includes safety, reliability, and performance, or a combination thereof;
   evaluating an actual configuration of the item of equipment;
   determining if the actual configuration complies with the target configuration;
   determining a predictive maintenance requirements for the item of equipment based on a longevity estimate, a probability of failure, a financial analysis, or a combination thereof;
   planning for the availability of at least one of resources and a component for performing maintenance consistent with the configuration maintenance requirements and the predictive maintenance requirement;
   including planning an upgrade requirement for upgrading the actual configuration to the target configuration if the actual configuration is noncompliant; and
   coordinating the upgrade requirement and the predictive maintenance requirement into a combined maintenance schedule for both the upgrade requirement and the predictive maintenance requirement.

2. The method according to claim 1 further comprising establishing a universal representation of components to facilitate acquisition of components from multiple sources, interchangeability of components, and tracking of component utilization, or a combination thereof.

3. The method according to claim 1 wherein the determining predictive maintenance requirements comprises:
   tracking performance data on the component; and
   determining the predictive maintenence requirement based upon the performance data with respect to a defined performance standard.

4. The method according to claim 3 wherein the planning comprises:
   scheduling performance of the predictive maintenance requirement at a defined respective time.

5. The method according to claim 1 wherein the planning comprises planning for the acquisition of at least one of the resources and the component consistent with the configuration maintenance requirements and the predictive maintenance requirements.

6. The method according to claim 1 wherein the planning comprises planning for the delivery the resources and the component for a time interval at a common geographic location.

7. The method according to claim 1 wherein determining the predictive maintenance requirement comprises estimating a longevity of the component based on a historical longevity of the component.

8. The method according to claim 1 wherein determining the predictive maintenance requirement comprises estimating a probability of failure of the component based on a historical probability of failure of the component.

9. The method according to claim 1 wherein determining the predictive maintenance requirement comprises estimating a financial impact of the component based on a historical financial impact of the component.

10. The method according to claim 1 wherein planning includes obtaining the component for the target configuration and scheduling human resources consistent with availability of the component.

11. The method according to claim 1 further comprising updating the target configuration based on an engineering change.

12. The method according to claim 1 further comprising updating the target configuration to facilitate compliance with a regulatory requirement.

13. The method according to claim 1 wherein planning includes scheduling and bringing together at least two of the following resources at a specific time and place: a requisite component, technical instructions, supporting equipment, acceptance criteria and procedures, tools, and repair personnel.

14. The method according to claim 1 further comprising establishing a universal nomenclature definition applicable to a component, an item of equipment, a system, and an assembly of components, or a combination thereof to support the exchange of data associated with the universal nomenclature definition.

15. The method according to claim 1 further comprising querying a database containing components associated with corresponding universal nomenclature descriptors.

16. The method according to claim 1 further comprising estimating a remaining life span of the component by determining a usage time span between an installation date of the component and a subsequent date, and deducting the usage time span from the longevity for the component.

17. The method according to claim 1, where determining the predictive maintenance requirement comprises estimating a longevity of the component based on a historical longevity of a different component analogous to the component.

18. The method according to claim 1, where determining the predictive maintenance requirement comprises estimating a longevity of the component based on a historical longevity of both the component and a different component analogous to the component.

19. The method according to claim 1, where determining the predictive maintenance requirement comprises estimating a probability of failure of the component based on a historical probability of failure of a different component analogous to the component.

20. The method according to claim 1, where determining the predictive maintenance requirement comprises estimating a probability of failure of the component based on a historical probability of failure of both the component and a different component analogous to the component.

21. The method according to claim 1, where determining the predictive maintenance requirement comprises estimating a financial impact of the component based on a historical financial impact of a different component analogous to the component.

22. The method according to claim 1, where determining the predictive maintenance requirement comprises estimating a financial impact of the component analogous based on a historical financial impact of both the component and a different component analogous to the component.

23. A system of managing maintenance activities for at least one item of equipment, the system comprising:
a configuration monitor for determining a configuration maintenance requirements for maintaining a target configuration of an item of equipment;
wherein the configuration monitor establishes the target configuration of the item of equipment and determines whether an actual configuration complies with the target configuration;
the target configuration being based on at least one of safety, reliability, and performance;
a predictive maintenance controller for determining a predictive maintenance requirements for the item of equipment based on a longevity estimate, a probability of failure, and a financial analysis, or a combination thereof;
a resource planner for planning for the availability of at least one of resources and a component for performing maintenance consistent with the configuration maintenance requirements and the predictive maintenance requirement;
wherein the resource planner is arranged to plan an upgrade requirement for upgrading the actual configuration to the target configuration if the actual configuration is noncompliant; and
wherein the resource planner coordinates the upgrade requirement and the predictive maintenance requirement into a combined maintenance schedule for both the upgrade requirement and the predictive maintenance requirement.

24. The system according to claim 23 wherein the resource planner schedules performance of the predictive maintenance requirement at a defined time to maximize availability of the item of equipment.

25. The system according to claim 23, wherein the predictive maintenance controller tracks performance data on the component and determines the predictive maintenance requirement based upon the performance data with respect to a defined performance standard.

26. The system according to claim 19, wherein the resource planner scheduals performance of the predictive maintenance requirement at a defined at a defined time to maximize availability of the item of equipment.

27. The system according to claim 23 wherein the resource planner plans for the acquisition of at least one of the resources and the component consistent with the configuration maintenance requirement and the predictive maintenance requirement.

28. The system according to claim 23 wherein the resource planner plans for the delivery of the resources and the component for a time interval at a common geographic location.

29. The system according to claim 23 wherein the longevity estimate of the component is based on a historical longevity of the component.

30. The system according to claim 23 wherein the probability of failure of the component is based on a historical probability of failure of the component.

31. The system according to claim 23 wherein the financial impact of the component is based on a historical financial impact of the component.

32. The system according to claim 23 further comprising: a purchasing system for obtaining the component for the target configuration; and a personnel management system for scheduling human resources consistent with availability of the component.

33. The system according to claim 23 wherein the target configuration complies with an engineering standard.

34. The system according to claim 23 wherein the target configuration complies with a regulatory requirement.

35. The system according to claim 23 further comprising a resource planner for scheduling and bringing together at least two of the following resources at a specific time and place:
a requisite component, technical instructions, supporting equipment, acceptance criteria and procedures, tools, and repair personnel.

36. The system according to claim 23 further comprising a universal nomenclature manager for establishing a universal nomenclature definition applicable to at least one of a component, an item of equipment, a system, and an assembly of components to support the exchange of data associated with the universal nomenclature definition.

37. The method according to claim 1, where determining the predictive maintenance requirement comprises estimating a longevity of the component based on a historical longevity of a different component analogous to the component.

38. The system according to claim 23, wherein the longevity estimate of the component is based on a historical longevity of a different component analogous to the component.

39. The system according to claim 23, where the longevity estimate of the component is based on a historical longevity of both the component and a different component analogous to the component.

40. The system according to claim 23, where the probability of failure of the component is based on a historical probability of failure of a different component analogous to the component.

41. The system according to claim 23, where the probability of failure of the component is based on a historical probability of failure of both the component and a different component analogous to the component.

42. The system according to claim 23, where the financial impact of the component is based on a historical financial impact of a different component analogous to the component.

43. The system according to claim 23, where the financial impact of the component is based on a historical financial impact of both the component and a different component analogous to the component.

* * * * *

UNITED STATES PATENT AND TRADEMARK OFFICE
CERTIFICATE OF CORRECTION

| | |
|---|---|
| PATENT NO. | : 7,124,059 B2 |
| APPLICATION NO. | : 10/799914 |
| DATED | : October 17, 2006 |
| INVENTOR(S) | : Michael Wetzer et al. |

It is certified that error appears in the above-identified patent and that said Letters Patent is hereby corrected as shown below:

On the Title Page

In column 1, item (73), delete "Accenture Global Services GmbH" and substitute --Accenture LLP-- in its place.

In column 2, line 1, under "*Primary Examiner*", Immediately after "James A" insert --.-- (period).

Page 2, in column 1, line 48, under "U.S. PATENT DOCUMENTS", after "6,691,064" delete "B1" and substitute --B2-- in its place.

Page 2, in column 1, line 51, under "U.S. PATENT DOCUMENTS", after "6,810,406" delete "B1" and substitute --B2-- in its place.

Page 2, in column 2, line 8, under "OTHER PUBLICATIONS", immediately after "Robert M.H." insert --,-- (comma).

Page 2, in column 2, line 11, under "OTHER PUBLICATIONS", delete "DIAGLOG" and substitute --DIALOG-- in its place.

Page 2, in column 2, line 26, under "OTHER PUBLICATIONS", delete "15:016901481" and substitute --15:01690148-- in its place.

Page 2, in column 2, line 38, under "OTHER PUBLICATIONS", after "maintenance kits," delete "today" and substitute --Today-- in its place.

In the Specification

In column 1, line 2, under "FIELD OF THE INVENTION", after "the maintenance" insert --of--.

In column 2, FIG. 6, line 1, before "flow chart" insert --a--.

In column 2, FIG. 7, line 1, before "flow chart" insert --a--.

In column 2, FIG. 8, line 1, before "flow chart" insert --a--.

UNITED STATES PATENT AND TRADEMARK OFFICE
CERTIFICATE OF CORRECTION

PATENT NO. : 7,124,059 B2
APPLICATION NO. : 10/799914
DATED : October 17, 2006
INVENTOR(S) : Michael Wetzer et al.

It is certified that error appears in the above-identified patent and that said Letters Patent is hereby corrected as shown below:

In the Specification (cont'd)

In column 4, line 48, after "keeping a configuration" delete "up to date" and substitute --up-to-date-- in its place.

In column 4, line 50, after "because of safety," delete "regulatory" and substitute --regulation-- in its place.

In column 4, line 55, after "eliminate the" delete "down-time" and substitute --downtime-- in its place.

In column 5, line 49, before "a component" insert --of--.

In column 9, line 14, after "may pertain to" delete "on".

In column 13, line 43, after "For example a similar" delete "items" and substitute --item-- in its place.

In column 15, line 21, after "item of equipment" delete "in".

In the Claims

In column 18, line 36, after "data with respect" insert --to--.

Column 23, in claim 1, line 3, after "maintenance" delete "requirements" and substitute --requirement-- in its place.

Column 23, in claim 1, line 15, after "maintenance" delete "requirements" and substitute --requirement-- in its place.

Column 23, in claim 1, line 21, after "maintenance" delete "requirements" and substitute --requirement-- in its place.

Column 23, in claim 2, line 4, after "of components," delete "and".

Column 23, in claim 2, line 5, immediately after "utilization" delete "," (comma) and substitute --.-- (period) in its place; and delete "or a combination thereof.".

UNITED STATES PATENT AND TRADEMARK OFFICE
CERTIFICATE OF CORRECTION

| | | |
|---|---|---|
| PATENT NO. | : 7,124,059 B2 | |
| APPLICATION NO. | : 10/799914 | |
| DATED | : October 17, 2006 | |
| INVENTOR(S) | : Michael Wetzer et al. | |

It is certified that error appears in the above-identified patent and that said Letters Patent is hereby corrected as shown below:

In the Claims (cont'd)

Column 23, in claim 3, lines 1-2, delete "the determining predictive" and substitute --determining the predictive-- in its place.

Column 23, in claim 5, lines 4-5, after "maintenance" delete "requirements" and substitute --requirement-- in its place (both occurrences).

Column 23, in claim 6, line 2, after "for the delivery" insert --of--.

Column 25, in claim 23, line 4, after "maintenance" delete "requirements" and substitute --requirement-- in its place.

Column 25, in claim 23, line 13, after "maintenance" delete "requirements" and substitute --requirement-- in its place.

Column 25, delete claim 24 in its entirety and replace with:

--24. The system according to claim 23 further comprising: a universal nomenclature manager for establishing a universal representation of components to facilitate acquisition of components from multiple sources, interchangeability of components, tracking of component utilization, or a combination thereof.--.

Column 25, in claim 26, line 1, delete "claim 19" and substitute --claim 25-- in its place.

Column 25, in claim 26, line 2, after "resource planner" delete "scheduals" and substitute --schedules-- in its place.

Column 25, in claim 26, line 3, delete "at a defined" (second occurrence).

Column 26, delete claim 37 in its entirety and replace with:

--37. The system according to claim 23 further comprising a universal nomenclature manager for querying a database containing components associated with corresponding universal nomenclature descriptors.--.

UNITED STATES PATENT AND TRADEMARK OFFICE
CERTIFICATE OF CORRECTION

PATENT NO. : 7,124,059 B2
APPLICATION NO. : 10/799914
DATED : October 17, 2006
INVENTOR(S) : Michael Wetzer et al.

It is certified that error appears in the above-identified patent and that said Letters Patent is hereby corrected as shown below:

<u>In the Claims (cont'd)</u>

Column 26, in claim 38, line 1, after "claim 23," delete "wherein" and substitute --where-- in its place.

Signed and Sealed this

Fourth Day of December, 2007

JON W. DUDAS
*Director of the United States Patent and Trademark Office*